(12) United States Patent
Stewart

(10) Patent No.: US 8,126,075 B2
(45) Date of Patent: Feb. 28, 2012

(54) TELECOMMUNICATIONS METHOD AND SYSTEM

(75) Inventor: Brian Gordon Stewart, Larkhall (GB)

(73) Assignee: University Court of Glasgow Caledonian University, Glasgow (GB)

( * ) Notice: Subject to any disclaimer, the term of this patent is extended or adjusted under 35 U.S.C. 154(b) by 1201 days.

(21) Appl. No.: 10/549,387

(22) PCT Filed: Mar. 16, 2004

(86) PCT No.: PCT/GB2004/001129
§ 371 (c)(1),
(2), (4) Date: Jun. 29, 2006

(87) PCT Pub. No.: WO2004/084513
PCT Pub. Date: Sep. 30, 2004

(65) Prior Publication Data
US 2006/0269011 A1    Nov. 30, 2006

(30) Foreign Application Priority Data
Mar. 18, 2003 (GB) .................................. 0306110.8

(51) Int. Cl.
*H04L 5/12* (2006.01)

(52) U.S. Cl. ........ 375/265; 375/135; 375/146; 375/260; 375/267; 375/269; 375/271; 375/272; 375/273; 375/279; 375/295; 375/299; 375/308

(58) Field of Classification Search .............. 375/265, 375/269, 135, 146, 260, 267, 271, 272, 273, 375/279, 295, 299, 308; 370/203–210, 338, 370/521
See application file for complete search history.

(56) References Cited

U.S. PATENT DOCUMENTS

| | | | | |
|---|---|---|---|---|
| 5,852,630 A * | 12/1998 | Langberg et al. | ............. | 375/219 |
| 5,878,085 A * | 3/1999 | McCallister et al. | ......... | 375/280 |
| 6,026,123 A | 2/2000 | Williams | | |
| 6,618,352 B1 * | 9/2003 | Shirakata et al. | ............. | 370/203 |
| 7,248,559 B2 * | 7/2007 | Ma et al. | ....................... | 370/208 |
| 7,339,882 B2 * | 3/2008 | Schaefer et al. | ............. | 370/203 |
| 7,391,713 B2 * | 6/2008 | Anvari | .......................... | 370/206 |

FOREIGN PATENT DOCUMENTS

| | | |
|---|---|---|
| EP | 0 752 779 | 1/1997 |
| WO | WO 93/09622 | 5/1993 |
| WO | WO02/078280 | * 10/2002 |

OTHER PUBLICATIONS

Thomas H. Williams; *A Digital Transmission System with Very High Immunity to Dynamic Multipath Distortion*; IEEE Transactions on Broadcasting; Mar. 1999; pp. 11-19; vol. 45, No. 1.

(Continued)

*Primary Examiner* — Dhaval Patel
(74) *Attorney, Agent, or Firm* — Alston & Bird LLP

(57) ABSTRACT

A system and method for encoding data for transmission over a telecommunications network. The system and method involve embedding a control data block ($I_{k0}$) within a plurality of real data blocks ($I_{N0}$). Preferably, real data in the real data blocks ($I_{N0}$) is convoluted with at least some of the control data in the control data block ($I_{k0}$) For example, each entry in each real data block ($I_{N0}$) may be phase convoluted with phase angle of the corresponding entry in the control block using an encoding module. Once this is done, the real data in the real data blocks and additionally the control data block in the control block is modulated with every sub carrier.

12 Claims, 24 Drawing Sheets

| Data 1 | Data 2 | ... | Data k | ... | Data (N-1) | Data N |
|---|---|---|---|---|---|---|

OTHER PUBLICATIONS

Thomas H. Williams; *Frequency Domain Reciprocal Modulation (FDRM) for Bandwidth-Efficient Data Transmission Over Channels with Dynamic Multipath*; Proc. 1999 NAB Broadcast Engineering Conference, Las Vegas; pp. 71-78.

International Search Report for PCT/GB2004/001129 completed Aug. 20, 2004.

Internatoinal Preliminary Report on Patentability for PCT/GB2004/001129 completed May 31, 2005.

* cited by examiner

| Normal Block $S_1$ | Reciprocal Block $S_2$ |

| Data 1 | Data 2 | ... | Data k | ... | Data (N-1) | Data N |

Figure 6

Data Block 1
$$\begin{bmatrix} A_{110}\exp(j(\phi_{110}+\phi_{k10})) \\ A_{120}\exp(j(\phi_{120}+\phi_{k20})) \\ \vdots \\ A_{1M0}\exp(j(\phi_{1M0}+\phi_{kM0})) \end{bmatrix}$$

Data Block 2
$$\begin{bmatrix} A_{210}\exp(j(\phi_{210}+\phi_{k10})) \\ A_{220}\exp(j(\phi_{220}+\phi_{k20})) \\ \vdots \\ A_{2M0}\exp(j(\phi_{2M0}+\phi_{kM0})) \end{bmatrix}$$

Pilot Control Data Block k
$$\begin{bmatrix} A_{k10}\exp(j\phi_{k10}) \\ A_{k20}\exp(j\phi_{k20}) \\ \vdots \\ A_{kM0}\exp(j\phi_{kM0}) \end{bmatrix}$$

$$\begin{bmatrix} A_{N10}\exp(j(\phi_{N10}+\phi_{k10})) \\ A_{N20}\exp(j(\phi_{N20}+\phi_{k20})) \\ \vdots \\ A_{NM0}\exp(j(\phi_{NM0}+\phi_{kM0})) \end{bmatrix}$$
Data Block N

Figure 7

| Data 1 | Data 2 | ... | Data k | ... | Data (N-1) | Data N |

| Data 1 | Pilot Control Block Data 2 | Data3 |

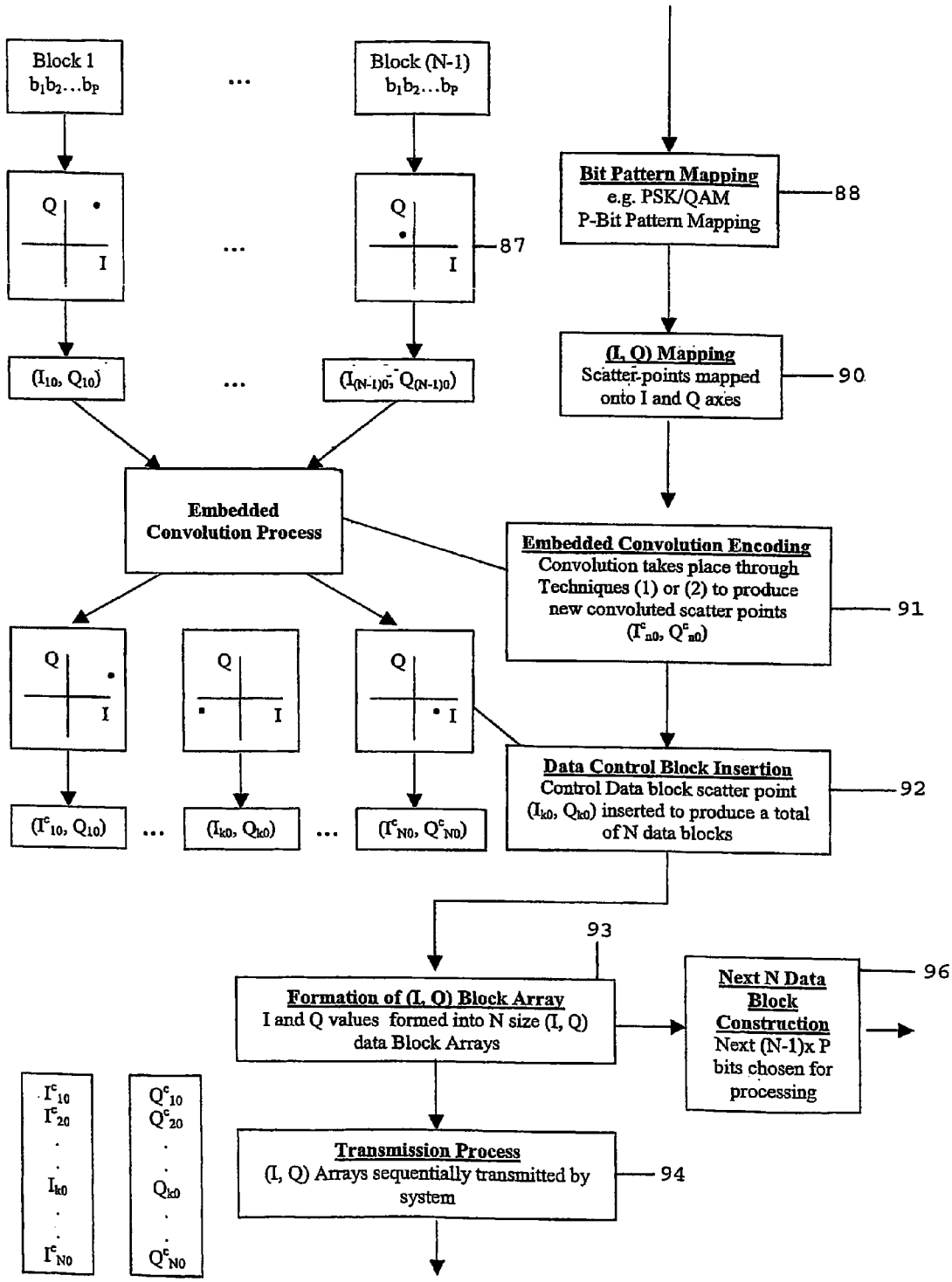
Figure 32 (Contd)

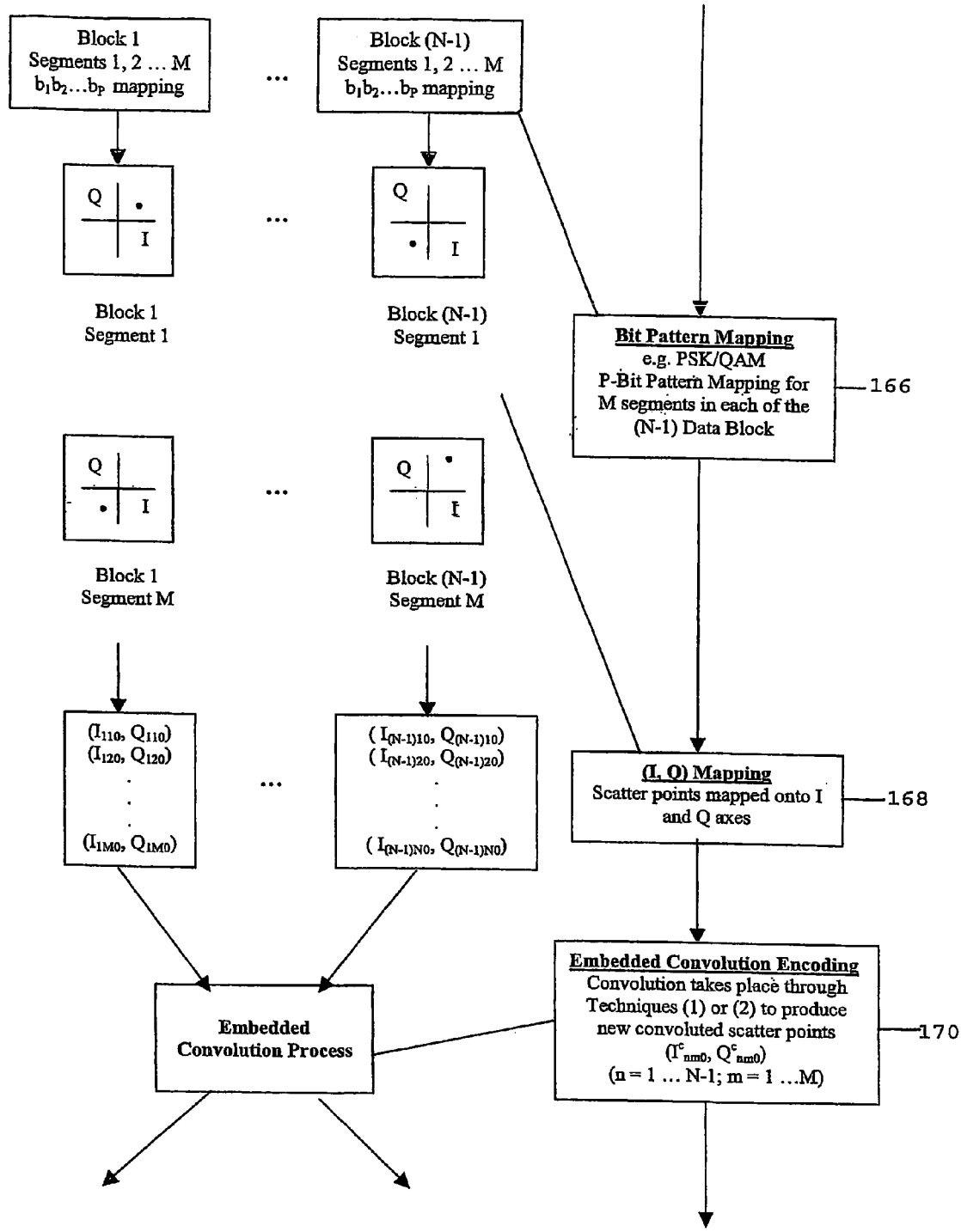
Figure 35 (Contd)

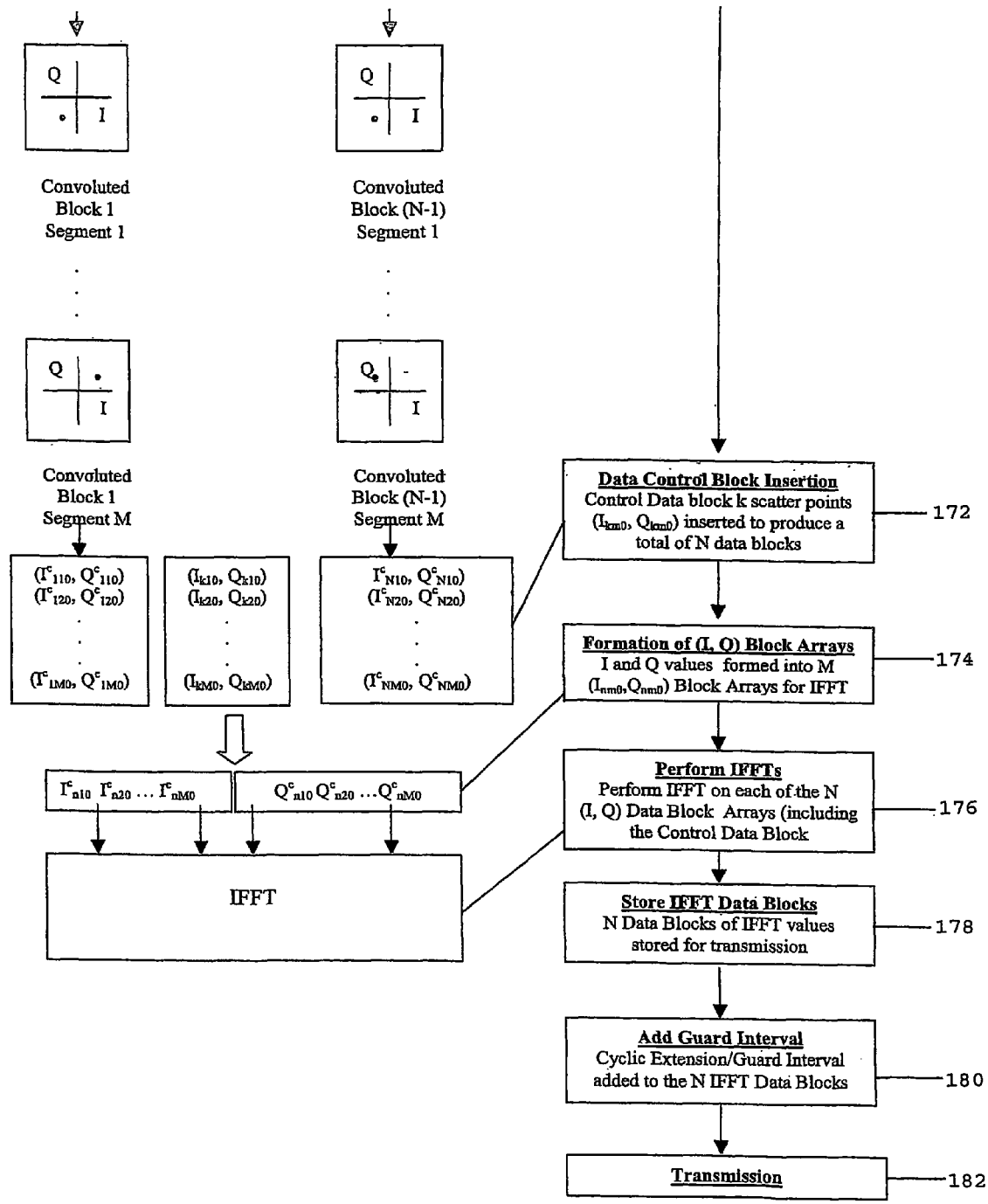
Figure 35 (Contd)

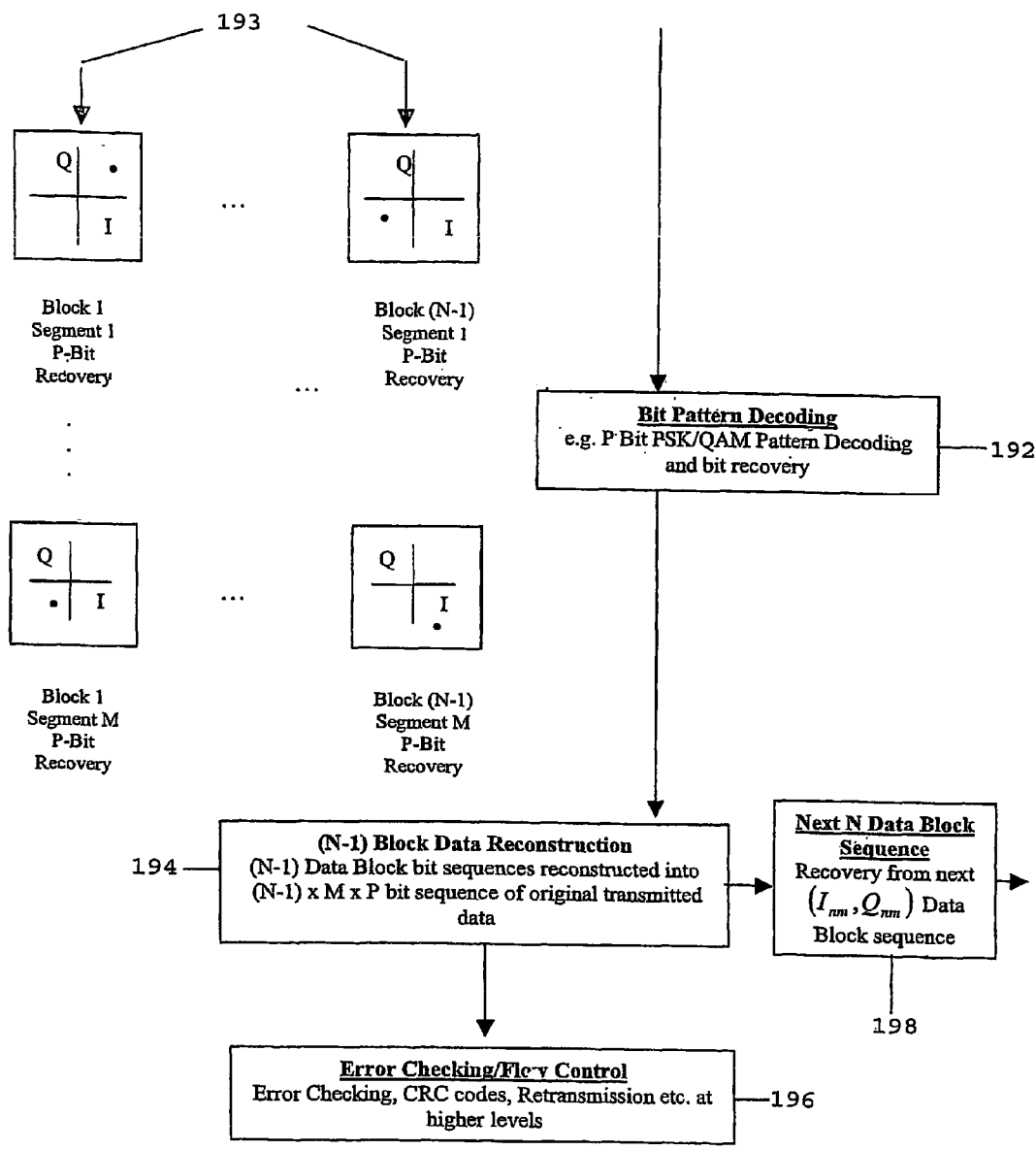
Figure 36 (Contd)

TELECOMMUNICATIONS METHOD AND SYSTEM

BACKGROUND OF THE INVENTION

1) Field of the Invention

The present invention relates to a method and a system for encoding and decoding telecommunication signals. In particular, the invention relates to a method and system that are useful in helping eliminate dynamic multi-path channel distortion problems common in fast fading wideband wireless communication environments, whilst simultaneously maintaining high data bandwidth transmission.

2) Description of Related Art

Many techniques for encoding and decoding telecommunications signals are known. One example is Orthogonal Frequency Division Multiplexing (OFDM), which is widely used in mobile communications, digital audio broadcasting and digital video broadcasting. OFDM provides a means of transmitting large data rates spread over multiple frequency channel sub-carriers, for example 52 (IEEE802.11a, g) or larger numbers such as 512, or 1024 carrier frequencies, see FIG. 1. Each frequency sub-carrier is modulated (e.g. PSK (Phase Shift Keying), QAM (Quadrature Amplitude Modulation) etc.) with 4, 5 or 6 bits of information, which over 1024 sub-carriers for example provides data rates of 4.096 Mbps, 5.12 Mbps and 6.144 Mbps respectively. Digital signal processing (DSP) techniques provide the means of producing the modulated multiple sub-carrier frequencies simply and efficiently rather than generating individual modulated sub-carrier frequencies and multiplexing them together.

FIG. 2 shows a very simplistic block diagram of an OFDM M-sub-carrier implementation. Here, M different bit pattern blocks of data, which consist of in-phase (I) and quadrature (Q) information, are presented to M inputs of an Inverse Fast Fourier Transform (IFFT) 10. This is the data to be modulated onto the M independent sub-carriers. The output components of the IFFT 10 are fed into a parallel-to-serial converter 12, which is clocked at the transfer rate of the system. This is followed by an anti-aliasing filter 14, after which the baseband modulated sub-carriers as shown in FIG. 1 are produced. It should be noted that sub-carrier 1 is modulated with the encoded bit patterns presented at input 1 of the IFFT; sub-carrier 2 with the encoded bit patterns presented at input 2 of the IFFT, etc.

Unfortunately, in the transmission of all these sub-carriers, sub-carrier channel distortion occurs due to signal echoes/fading or variations in attenuation between transmitter and receiver. This causes errors on decode as the original I and Q values are not reproduced at the receiver. Because these effects are frequency dependent, distortion influences differ across the frequency spectrum used by the sub-carriers. These channel distortion effects are often compensated for in OFDM through pilot symbol assisted schemes, which attempt to evaluate each channel's transfer function or distortion and compensate the received data accordingly. Basically, the pilot symbols are known modulated values, which are measured at the receiver and compared with the expected known true values. This allows the distortion effect of each sub-channel to be evaluated, removed and an estimate of the original signal of the sub-carrier recovered. These pilot symbols are embedded or interspersed with the data symbols, as shown in FIG. 3. For example, 4 pilot tone frequencies are interspersed across the 52 sub-carrier OFDM symbol transmission in the IEEE802.11a.

Estimates of the sub-carrier channel distortion of the data channels are made using the received values of the known pilot carrier channels. Estimates of the actual data carrying channel distortion effects are interpolated from the pilot channels, i.e. the actual channel effects of the data carrier sub-channels are not measured directly, but linearly interpolated from pilot channel determinations which are close to the data carrying sub-carrier channels themselves.

Two significant problems in implementing pilot carrier techniques exist. The first is achieving good signal-to-noise ratios for the pilot tones. Generally, the larger the strength of the pilot tones the better the channel distortion estimation. However, relatively large peak transmitted powers for the OFDM symbols can cause transmitter distortion. The problem is then choosing pilot symbols to minimise this distortion. Usually the variability of the peak power above the average value is measured in terms of the crest factor (CF). The crest factor can be minimised by designing pilot symbols, which have a random phase value. There are a number of techniques to assign such phase values, e.g. Shapiro-Rudin; Newmann; Narahasmi and Nojima algorithms. Adaptive optimisation techniques for minimum crest factors are also being considered.

The second problem with pilot carrier techniques relates particularly to communication systems in which channel response variations occur more rapidly across the wideband frequency spectrum of the subcarriers. In this situation, channel response effects between subcarrier frequencies can be poorly interrelated and a simple linear or non-linear extrapolation on current (or previous) pilot tone channel response evaluations is not sufficient. The time taken to recalibrate pilot tone channel coefficients to correct for distortion may result in valuable lost time, which could have been used for vital data transmission. In addition, for more radiply changing channel environments, once the new paradigm for the correction has been determined, the channel response may already have changed, resulting in the initiation of a further re-calibration of the pilot tones.

Recently a new method of modulation developed by T D Williams for use in mobile digital communication systems has been introduced, primarily to deal with the second problem presented above. This is described in U.S. Pat. No. 6,026,123. This is called Frequency Domain Reciprocal Modulation (FDRM). The main aim of this technique is to help eliminate dynamic multi-path channel distortion problems, which are common in wireless communications and thus provide a more robust and improved error rate communications link for OFDM systems. FDRM has many applications covering for example mobile telephony, mobile internet access, digital audio broadcasting, digital video broadcasting and microwave applications. FDRM is considered to be a companion to OFDM and so is implemented within OFDM type communication systems. FDRM can operate in a single carrier frequency modem, or in multi sub-carrier OFDM.

FDRM involves transmitting two packets or data blocks. These blocks are a normal block, which includes the data, and a reciprocal block, see FIG. 4. Each block could represent a symbol of M modulated sub-carriers in OFDM or indeed a single carrier frequency in a modem. In order to understand the basic principles of FDRM, a single sub-carrier frequency in OFDM will be considered. In FDRM, each of the normal and reciprocal transmission blocks contains the same data in a different way. For example, if the modulation technique for the sub-carrier is PSK then for a single sub-carrier the first data block is transmitted with amplitude A and phase angle $\phi$, i.e. $S_1 = A \exp(j\phi)$. This represents a digital block pattern transmission, which is determined by the amplitude and the phase angle on a constellation scatter diagram. Unfortunately, when an echo or fading signal is also received in a wireless communications link, the point in the received constellation diagram is rotated and the amplitude changes, see FIG. 5. This results in an error, because the decoded block pattern is now different from the original due its new position on the scatter plot.

Williams has shown, see U.S. Pat. No. 6,026,123 and IEEE Trans. on Broadcasting, Vol 45, pp. 11-15, March 1999 and Proc. 1999 NAB Broadcast Engineering Conference, Las Vegas, pp. 71-78, that for the time domain transmission, the effect of an echo signal can be expressed mathematically as follows:

$$X(t)=S(t)+aS(t-T)$$

where X(t) is the received signal, and S(t) the received signal when no noise or channel response is present. The term aS(t−T) is a received echo signal, and so causes channel distortion, with T equal to the delay time of the echo path. In the frequency domain, X(t) is transposed to:

$$X(f)=S(f)(1+ae^{-j2\pi fT})$$

This may be written as:

$$X(f)=S(f)H(f)$$

where H(f) is the complex frequency response associated with the transmission channel. The source of this distortion could include weak and strong echoes caused for example by moving mobile transmitters and/or receivers etc. If the transmission channel is perfect, then H(f) has an amplitude of one and a phase angle of zero, resulting in no rotation on the scatter plots.

To help alleviate the problems of channel distortion, FDRM transmits the original sub-carrier data block, followed immediately by the second data block, which contains the inverse of the original sub-carrier S i.e.:

$$(1/A)\exp(-j\phi)$$

In the first instance, it is presumed that the distortion on the same channel has not altered significantly during the two block transmission. This would normally be correct as long as the data block transmission and propagation time is shorter than the dynamically varying effect of the channel. Letting the original transmitted sub-carrier be represented by $S_1$ and the inverse sub-carrier be represented by $S_2$, then after the same channel distortion (echo/fading) has affected both transmission sub-carriers, the received signals $X_1$ and $X_2$ respectively become:

$$X_1=S_1H=A\exp(j\phi)H$$

$$X_2=S_2H=(1/A)\exp(-j\phi)H$$

A coherent quadrature detector measures the in-phase component (I) and the quadrature (90°) out-of-phase component (Q) of both transmitted signals. In this case, the received quadrature signals may be represented by:

$$X_1=I_1+jQ_1$$

$$X_2=I_2+jQ_2$$

The solutions for recovering the originally sent, unimpaired, sub-carrier signal S, i.e. free from channel distortion and also attenuation, and also a measure of the channel response H are:

$$S=\sqrt{\frac{X_1}{X_2}}$$

$$H=\sqrt{X_1X_2}$$

These can be re-expressed in terms of the I and Q components through:

$$S=\sqrt{\frac{(I_1+jQ_1)}{(I_2+jQ_2)}}$$

$$H=\sqrt{(I_1+jQ_1)(I_2+jQ_2)}$$

It is easy to show mathematically, after a degree of manipulation of the equations, that with the inclusion of channel response, the recovered or estimated values of the undistorted original sub-carrier transmitted amplitudes can be determined as follows:

$$\hat{A}=\sqrt{\frac{(I_1^2+Q_1^2)^{1/2}}{(I_2^2+Q_2^2)^{1/2}}}$$

$$\hat{\phi}=\frac{1}{2}\tan^{-1}\left[\frac{I_2Q_1-I_1Q_2}{I_1I_2-I_1Q_2}\right].$$

An estimate of the recovered in-phase and quadrature components is given through $$\hat{I}=\hat{A}\cos\hat{\phi}$$

$$\hat{Q}=\hat{A}\sin\hat{\phi}$$

These are estimates of the original sub-carrier transmitted signals, not the received signals and thus the need for equalisers is not required. The gain of the transmitter (assuming it is constant), the attenuation over the transmission path, and also channel echoes have all been eliminated presuming of course the distortion has not altered significantly throughout the two block transmission. The amplitude of the sub-carrier is the normalised amplitude in relation to the definition of A=1 on the scatter plot. FDRM therefore has the capability to completely remove the effects of echo channel distortion and reproduce the original sub-carrier data free from multi-path echo signals. Of course, the inclusion of noise, or small variations due to a changing channel response, on the received detector quadrature components affects the error rate performance of these algorithms. These influences are discussed briefly later.

There are two major weaknesses with FDRM. Firstly, there are dramatic variations of the transmitted amplitude around the normalised amplitude value. When significant noise is present and the amplitude of $S_1$ is increased to accommodate larger or smaller amplitude signals than the normalised value, for example those amplitude signals required in normal QAM modulation, then there are large errors on decoding. This arises due to the nature of the inverse amplitude of the sub-carriers being transmitted in the reciprocal data block transmission, i.e. the signal-to-noise of $S_2$ decreases when the amplitude of $S_1$, increases thus introducing decoding noise errors. For this reason a maximum normalised value of amplitude A=1.333 has been recommended for FDRM transmissions. In addition, it is believed that FDRM is only practically possible in modulation techniques that have no low energy frequency components or magnitudes. The best example of such a modulation technique is OFDM, where there is indeed an equal spread of energy frequency components. However, this cannot always be guaranteed in OFDM, particularly for QAM where the amplitudes can vary significantly.

Another disadvantage of FDRM is that due to the nature of the algorithms, and the inherent signs of the I and Q component values, the inverse tangent introduces a phase ambiguity of 180° for some of the decoded phase angle determinations. To eliminate this problem, pilot carrier tones within the transmissions have been suggested to track carrier phase changes with frequency in order to indicate the +ve in-phase (I) axis. However, this requires further information to be transmitted along with the data itself. Other solutions to this problem include the concepts of constellation scatter plots without 180° rotational symmetry, or small DC offsets in scatter points to locate the positive phase axis of the scatter diagram. These tend to increase the complexity of the technique, without providing significant overall improvements.

BRIEF SUMMARY OF THE INVENTION

An object of the present invention is to overcome one or more of the problems associated with the prior art.

Various aspects of the invention are defined in the independent claims. Some preferred features are defined in the dependent claims.

According to a first aspect of the invention, there is provided a method for encoding data for transmitting over a telecommunications network comprising: embedding a control data block within a plurality of real data blocks; modulating the real data blocks with one or more transmission sub-carrier signals; and modulating the control data block with every transmission sub-carrier used to modulate the real data blocks.

Each time real data is transmitted on one or more sub-carrier transmission channels, control data is sent on the same channels. This avoids the need to interpolate the transmission effectiveness of given channels from that of other channels, thereby improving the decoding efficiency when the signal is received.

The method may further comprise convoluting data in each real data block with data in the control block. The step of convoluting may use a phase angle of the control data. The step of convoluting may comprise adding or subtracting the phase angle of each of the control data entries from the phase angles of the corresponding entries of each data block. An advantage of convoluting the phase angles of the real data with the corresponding phase angles of the control data in the transmitted signal is that when the signal is sent and received at a decoder, knowledge of the control phase angle is not needed to decode the received signal. This means that adaptive phase control techniques can be used without having to continuously send the receiver details of changes in the phase angles of the control block data.

The phase angles of each of the control data entries may be randomly selected. Alternatively, the phase angles of each of the control data entries may be a function of the phase angles of the corresponding entries of one or more of the real data blocks. The phase angle of each entry in the control data entry block may comprise the sum of all of the phase angles of the corresponding entries in the real data blocks.

Each of the control and real data blocks may have m data entries. There may be m sub-carriers. Each entry of each of the control and real data blocks is modulated with the corresponding one of the m sub-carriers.

BRIEF DESCRIPTION OF THE SEVERAL VIEWS OF THE DRAWINGS

Various aspects of the invention will now be described by way of example only and with reference to the accompanying drawings, of which:

FIG. 6 is a representation of a transmitted sequence of N data blocks, with a pilot control block embedded within the sequence;

FIG. 7 is a representation of a signal that includes a pilot control block embedded within a plurality of data blocks, each of which has been convoluted with data from the pilot control block;

DETAILED DESCRIPTION OF THE INVENTION

Figure 1:
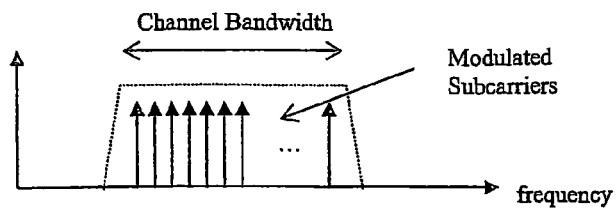
FIG. 1 depicts a diagram of an Orthogonal Frequency Division Multiplexing technique.
Figure 2:
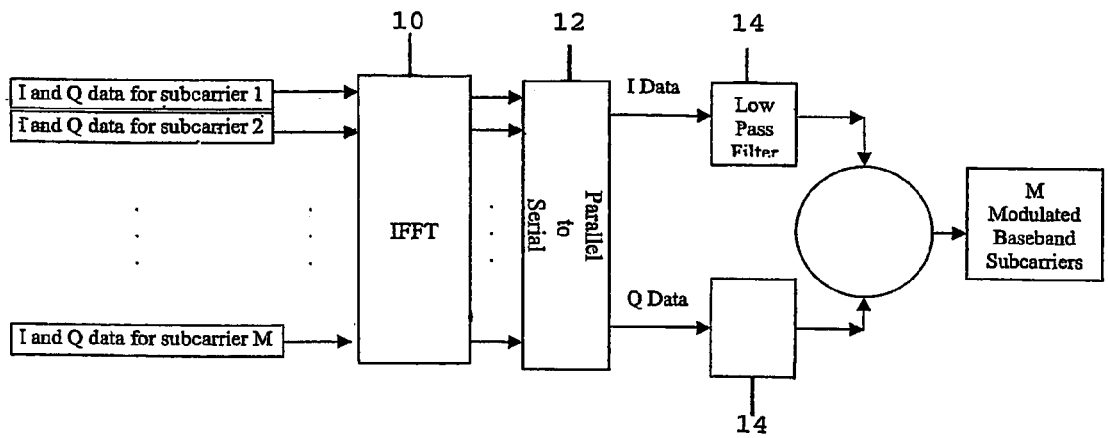
FIG. 2 is a diagram of the Orthogonal Frequency Division Multiplexing technique showing the implementation of M-sub-carriers.
Figure 3:
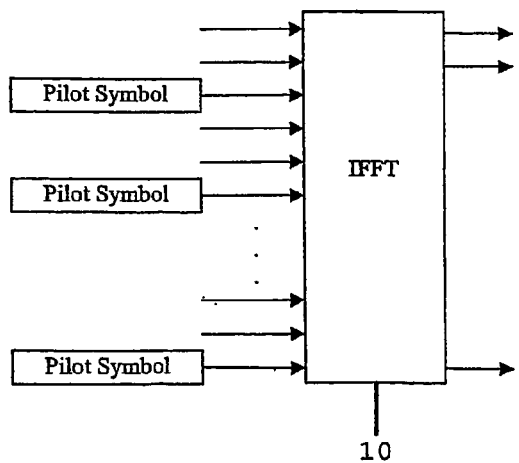
FIG. 3 is a diagram depicting the introduction of Pilot Symbols to the Orthogonal Frequency Division Multiplexing technique.
Figures 4, 5:
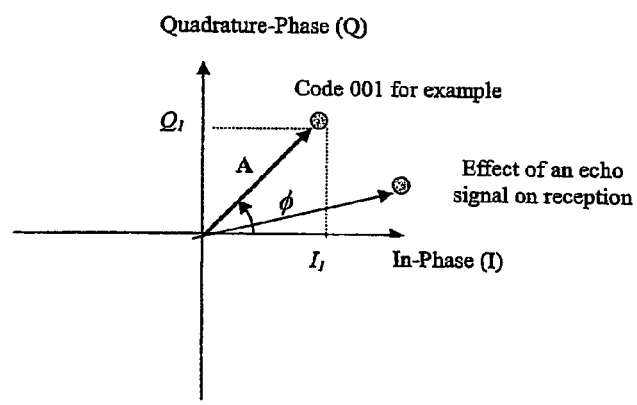
FIG. 4 depicts two packets or data blocks, normal and reciprocal, for Frequency Domain Reciprocal Modulation.
FIG. 5 is a scatter graph showing how the point in a received constellation diagram is rotated and the amplitude changed during a digital block pattern transmission.

In the method in which the invention is embodied, a pilot symbol data block with control/calibration information is embedded within an N block M sub-carrier data transmission stream in OFDM. This control/calibration data may be chosen in any way that allows optimized recovery of the data. The real data make take any form and may, for example, include error correction information, such as a cyclic redundancy check. The method in which the invention is embodied differs from OFDM pilot tones in that here, all M sub-carriers are used in the transmission of the pilot/control symbol itself. In addition, the data block information is preferably convoluted with the pilot symbol information. In an enhancement of the basic method, the data block and the pilot control block are also convoluted with all the transmitted sub-carrier data phase angles. An advantage of this is that crest factors can be kept down in OFDM transmissions, as the phase angles are more randomly distributed in the pilot control symbol. On reception, the received data is de-convoluted with the use of the pilot control block.

Two implementations of this new transmission and reception method are proposed. The general outline of a first implementation is as follows. A series of N data blocks is transmitted and received sequentially in an M sub-carrier OFDM system, see FIG. 6. It is assumed that the channel distortion, though different for each sub-carrier, remains constant throughout the duration of the N block transmission. A pilot control data block, block k, is embedded as one of the N data blocks and is used as control information for decoding and channel distortion elimination purposes. A more complex implementation could include more than one pilot control data block in any general N data block transmission. However, the simplest and most efficient arrangement is to include a single pilot control block.

Assuming the OFDM sub-carrier representation, each of the N data blocks of FIG. 6 has M sub-carriers, with each sub-carrier containing modulated information, which can be represented by a point in a scatter plot denoted through the appropriate I and Q co-ordinate values. In OFDM, the encoded elements of each sub-carrier in the N Block transmission may be represented as:

$$X_{nm0}=I_{nm0}+jQ_{nm0}=A_{nm0}\exp(j\phi_{nm0})\ n=1,2\ldots N;\\ m=1,2\ldots M$$

where $X_{nm0}$=the original encoded quadrature signal in Data Block n, subcarrier m; $I_{nm0}$=the original I encoded data in Data Block n, subcarrier m; $Q_{nm0}$=the original Q encoded data in Data Block n, subcarrier m. The subscript "0" refers to the original true value of any component. The above information may be represented in the form of a transmission sequence of the sub-carriers within the N Blocks, viz.

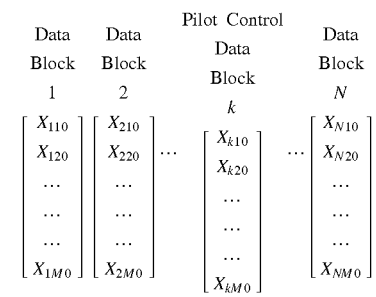

where: $X_{110}$=original encoded quadrature signal in Data Block 1, subcarrier 1, and $X_{210}$=original encoded quadrature signal in Data Block 2, subcarrier 1, etc.

To encode the message, firstly, the pilot control data block k has M sub-carriers with predetermined quadrature transmission values given by:

$$X_{km0} = I_{km0} + jQ_{km0}$$

where $$I_{km0} = A_{km0} \cos \phi_{km0} \text{ and } Q_{km0} = A_{km0} \sin \phi_{km0}$$
$$(m=1, 2 \ldots M).$$

Generally, the pilot data block k should be sent in the middle of the N block transmission so that it represents an effective "middle" measure of channel distortion and attenuation. Of course the system could be adaptive N and k dependent, based on the severity of the channel distortion conditions.

All the M transmitted sub-carriers in the N data blocks, apart from the sub-carriers in data block k, are phase angle convoluted with the pilot control data block phase angles $\phi_{km0}$. In this first embodiment, the convolution is simple, namely that the $m^{th}$ sub-carrier phase angle of block k, i.e. $\phi_{nm0}$ is added onto the $m^{th}$ sub-carrier phase angles $\phi_{nm0}$ of the other N data blocks prior to new encoding and forwarding to the IFFT. In other words prior to modulation, each data point on the constellation diagram, intended for modulation onto sub-carrier m, is rotated by $\phi_{km0}$ to provide new convoluted I and Q values for modulation onto the sub-carrier.

The new convolution encoded data blocks to be transmitted are then given by:

$$X_{nm0} = A_{nm0} \exp(j(\phi_{nm0} + \phi_{km0})) = I_{nm0}^c + jQ_{nm0}^c \quad n=1, 2 \ldots N(n \neq k); m=1, 2 \ldots M$$

where $I_{nm0}^c$ and $Q_{nm0}^c$ are the true quadrature values of the data to be modulated after convolution has taken place. The transmitted data block sequence with sub-carrier information can now be represented as shown in FIG. 7.

The sequence of FIG. 7 is transmitted to a coherent detector system. After suffering from the effects of attenuation and channel distortion, the in-phase and quadrature components are measured as:

$$X_{nm} = I_{nm} + jQ_{nm} = A_{nm} \exp(\phi_{nm})$$

which can be expressed in the form:

$$X_{nm} = I_{nm} + jQ_{nm} = (I_{nm0}^c + jQ_{nm0}^c) A_{att} H = A_{nm0} \exp(j(\phi_{nm0} + \phi_{km0})) A_{att} H (n \neq k)$$

$$X_{km} = I_{km} + jQ_{km} = (I_{km0} + jQ_{km0}) A_{att} H = A_{km0} \exp(j\phi_{km0}) A_{att} H (n=k).$$

Here, $I_{nm}, Q_{nm}$ (n=1, 2 ... N) are the decoded I and Q components of the m sub-carriers of the N data blocks in the presence of attenuation and channel distortion; $I_{nm0}^c, Q_{nm0}^c$ are the transmitted original convoluted quadrature components referenced to a predefined normalised encoding constellation plot; $A_{nm0}, \phi_{nm0}$ are the amplitude and phase angle values for the original (non-convoluted) data in each data block, again referenced to a predefined normalised constellation plot; $A_{att}$ is the attenuation factor for the signals, and H is the channel distortion representing the effects of signal distortion echo.

Transmitter power gain could be included in each expression. Indeed it could be included within $A_{att}$. However, as will be demonstrated below, it is possible to eliminate both $A_{att}$ and channel distortion and recover the original transmitted normalised I and Q magnitudes based on the data block k transmitted values, as long as $A_{att}H$ is considered constant, or changes little, over the N block transmission.

Providing a minimised crest factor for the pilot control data block symbol is a problem for OFDM systems. However, this can be resolved in part by using a random phase assignment for each sub-carrier in the pilot control data block. As long as the phase $\phi_{km0}$ assignments for each sub-carrier in the pilot control data block are defined, then the appropriate sub-carrier $\phi_{km0}$ values can be added to each original sub-carrier phase angle prior to modulation for all data block transmissions. Once the data is modulated with the sub-carriers, this means that for sub-carrier 1, $\phi_{k10}$ is added to the phase angles of all the first sub-carriers in the (N–1) Data Blocks; $\phi_{k20}$ added to the phase angles of all second sub-carriers etc.

Dividing each of the received $X_{nm}$ signals by the received control data block signal $X_{km}$ eliminates $A_{att}H$ resulting in:

$$\frac{X_{nm}}{X_{km}} = \frac{(I_{nm} + jQ_{nm})}{(I_{nm} + jQ_{km})} = \frac{A_{nm0} \exp(j(\phi_{nm0} + \phi_{km0})) A_{att} H}{A_{km0} \exp(j\phi_{km0}) A_{att} H} = \frac{A_{nm0}}{A_{km0}} \exp(j\phi_{nm0})$$

In terms of measured $I_{nm}$ and $Q_{nm}$ values, then $$\frac{(I_{nm} + jQ_{nm})}{(I_{nm} + jQ_{km})} = \frac{(I_{nm}I_{km} + Q_{nm}Q_{km}) + j(I_{km}Q_{nm} - I_{nm}Q_{km})}{(I_{km}^2 + Q_{km}^2)} = \frac{A_{nm0}}{A_{km0}} \exp(j\phi_{nm0})$$

$A_{att}H$, if required for each sub-carrier channel, can be estimated using:

$$A_{att}H = \frac{X_{km}}{A_{km0} \exp(j\phi_{km0})}.$$

After some simple manipulation of complex numbers, and equating real and imaginary parts, the following algorithms result for estimation of the normalised original transmitted amplitude and phase components for each data block and sub-carrier. It should be noted that these are relative to the original normalised transmitted data block k parameters, based on the measured coherent detected quadrature components, i.e.

$$\hat{A}_{nm} = A_{km0} \sqrt{\left[\frac{I_{nm}^2 + Q_{nm}^2}{I_{km}^2 + Q_{km}^2}\right]} \quad n = 1, 2 \ldots N(n \neq k); m = 1, 2 \ldots M;$$

$$\hat{\phi}_{nm} = \tan^{-1}\left[\frac{I_{km}Q_{nm} - I_{nm}Q_{km}}{I_{nm}I_{km} + Q_{nm}Q_{km}}\right] \quad n = 1, 2 \ldots N(n \neq k); m = 1, 2 \ldots M;$$

In these equations $\hat{A}_{nm}$ denotes the estimate of the true amplitude $A_{nm0}$ of data block n sub-carrier m relative to the true normalised known value $A_{km0}$, and $\hat{\phi}_{nm}$ denotes the estimate of the true phase component $\phi_{nm0}$ of the originally transmitted data block n sub-carrier m. Estimates of the true orthogonal components $I_{nm0}, Q_{nm0}$ of data block n sub-carrier m, denoted by $\hat{I}_{nm}, \hat{Q}_{nm}$ may also be evaluated relative to known data block k parameters, and after some manipulation of the equations above, can be evaluated as follows:

$$\hat{I}_{nm} = A_{km0} \frac{(I_{nm}I_{km} + Q_{nm}Q_{km})}{(I_{km}^2 + Q_{km}^2)} = \hat{A}_{nm} \cos\hat{\phi}_{nm} \quad n = 1, 2, \ldots, N(n \neq k)$$

$$\hat{Q}_{nm} = A_{km0} \frac{(I_{km}Q_{nm} - I_{nm}Q_{km})}{(I_{km}^2 + Q_{km}^2)} = \hat{A}_{nm} \sin\hat{\phi}_{nm} \quad n = 1, 2, \ldots, N(n \neq k)$$

A major advantage of this technique is that the phase angle assignments of the pilot tone sub-carriers do not need to be known by the receiver for decoding, instead only the amplitude $A_{km0}$ need be known. Currently, in OFDM systems phase angle assignments of the pilot tone sub-carriers are required by the receiver in order to allow accurate estimation of the channel distortion, and thus recovery of the original data. In this first embodiment of the invention, however, the assignment of pilot tone sub-carrier phase angles can vary at any time, without the need to inform the receiver. This allows adaptive phase angle assignments to be used as an extremely powerful tool, as their precise details are not required for decode.

An alternative encoding scheme may be implemented without convoluting $\phi_{k0}$ within the transmitted block signals, but still embeds the control data block k in the data block transmission i.e.

$$X_{nm} = I_{nm} + jQ_{nm} = (I_{nm0} + jQ_{nm0})A_{att}H = A_{nm0} \exp(j\phi_{nm0}) A_{att}H(n \neq K)$$

$$X_{km} = I_{km} + jQ_{km} = (I_{km0} + jQ_{km0})A_{att}H = A_{km0} \exp(j\phi_{km0}) A_{att}H$$

For this situation, it is easy to show that the decoding algorithms become:

$$\hat{A}_{nm} = A_{km0}\sqrt{\left[\frac{I_{nm}^2 + Q_{nm}^2}{I_{km}^2 + Q_{km}^2}\right]} \quad n = 1, 2 \ldots N(n \neq k)$$

$$\hat{\phi}_{nm} = \tan^{-1}\left[\frac{I_{km}Q_{nm} - I_{nm}Q_{km}}{I_{nm}I_{km} - Q_{nm}Q_{km}}\right] + \phi_{km0} \quad n = 1, 2 \ldots N(n \neq k)$$

$$\hat{I}_{nm} = \hat{A}_{nm}\cos\hat{\phi}_{nm} \quad n = 1, 2, \ldots, N(n \neq k)$$

$$\hat{Q}_{nm} = \hat{A}_{nm}\sin\hat{\phi}_{nm} \quad n = 1, 2, \ldots N(n \neq k)$$

There are two main disadvantages of this alternative simpler implementation. Firstly, the phase angle of each pilot tone sub-carrier has to be known by the receiver. As this may be randomly assigned, then the receiver needs updates on these values. This is not required for the technique outlined previously. Secondly, more computation is required for each sub-carrier estimation, as the phase angle of the pilot tones sub-carriers must be added onto the evaluated phase angle for each sub-carrier.

An advantage of the first embodiment of the invention is that less data blocks have to be transmitted than for FDRM. For (N−1) information data blocks, the number of data blocks transmitted using this technique may be denoted by $$\text{Data Blocks}_{Technique(1)} = N$$

In FDRM, for (N−1) information data blocks, the number of transmitted data blocks is given by:

$$\text{Data Blocks}_{FDRM} = 2(N-1)$$

Thus, the percentage reduction (or improvement) in the required number of data blocks transmitted for the same information transfer, i.e. the percentage data block reduction (DBR), using this first embodiment in comparison with FDRM is given by:

$$DBR_{Technique(1)} = \frac{\text{Data Blocks}_{Technique(1)}}{\text{Data Blocks}_{FDRM}} = \left(1 - \frac{N}{2(N-1)}\right) \times 100\%$$

Figure 8:
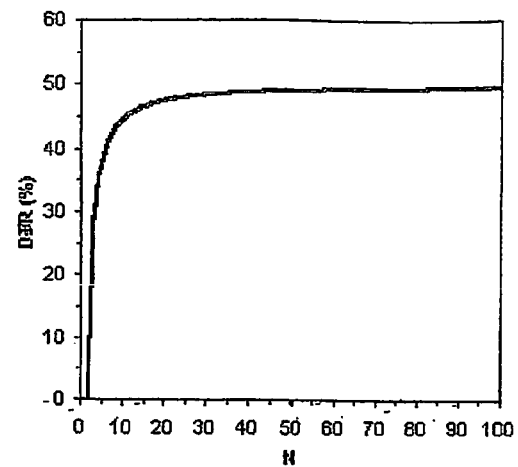
FIG. 8 is a plot of percentage data block reduction versus number of blocks transmitted for a first method in which the invention is embodied.

FIG. 8 outlines the percentage DBR for various values of N, indicating the advantage of the reduced number of data blocks transmitted using the method in which the first aspect of the invention embodied against. FDRM.

Figure 9:
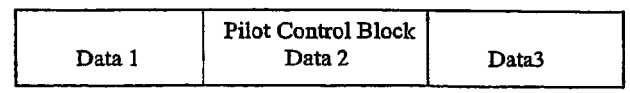
FIG. 9 is a representation of an N-block transmission in which N=3 and k=2.

A specific example of how the first encoding method could be implemented will now be described. In this, two information data blocks are prepared for transmission. A third pilot data control block is inserted between these two data blocks to eliminate channel distortion as shown in FIG. 9. Thus, for the transmission of FIG. 9, N=3, and k=2. The % DBR of this is therefore 25%. For simplicity, only one of the sub-carriers in all three data blocks will be considered for simulation. As will be appreciated, all other sub-carriers behave in an identical manner. The original data to be transmitted onto the sub-carriers may be expressed as:

$$\text{Data } 1 = I_{10} + jQ_{10}$$

$$\text{Data } 3 = I_{30} + jQ_{30}$$

The true pilot control data for the sub-carrier of data block 2 is given by:

$$\text{Data } 2 = I_{20} + jQ_{20}$$

After convolution, the data placed onto the sub-carriers becomes:

$$X_{10} = I_{10}^c + jQ_{10}^c = A_{10}\exp(j(\phi_{10} + \phi_{20}))$$

$$X_{20} = I_{20} + jQ_{20} = A_{20}\exp(j\phi_{20})$$

$$X_{30} = I_{30}^c + jQ_{30}^c = A_{30}\exp(j(\phi_{30} + \phi_{20}))$$

The received or detected sub-carrier information after channel distortion effects is given by:

$$X_1 = I_1 + jQ_1 = A_{10}\exp(j(\phi_{10} + \phi_{20}))A_{att}H$$

$$X_2 = I_2 + jQ_2 = A_{20}\exp(j\phi_{20})A_{att}H$$

$$X_3 = I_3 + jQ_3 = A_{30}\exp(j(\phi_{30} + \phi_{20}))A_{att}H.$$

where $I_1$, $I_2$, $I_3$, $Q_1$, $Q_2$, $Q_3$ are the measured or detected quadrature components at the receiver.

Estimates of the original de-convoluted data, relative to the known transmitted normalised data block 2 parameters, are recovered from the decoding algorithms as follows:

$$\hat{A}_1 = A_{20}\sqrt{\left[\frac{I_1^2 + Q_1^2}{I_2^2 + Q_2^2}\right]} \quad \hat{\phi}_1 = \tan^{-1}\left[\frac{I_2Q_1 - I_1Q_2}{I_1I_2 + Q_1Q_2}\right]$$

$$\hat{I}_1 = \hat{A}_1\cos\hat{\phi}_1 \qquad \hat{Q}_1 = \hat{A}_1\sin\hat{\phi}_1$$

$$\hat{A}_3 = A_{20}\sqrt{\left[\frac{I_3^2 + Q_3^2}{I_2^2 + Q_2^2}\right]} \quad \hat{\phi}_3 = \tan^{-1}\left[\frac{I_2Q_3 - I_3Q_2}{I_3I_2 + Q_3Q_2}\right]$$

$$\hat{I}_3 = \hat{A}_3\cos\hat{\phi}_3 \qquad \hat{Q}_3 = \hat{A}_3\sin\hat{\phi}_3$$

The effectiveness of the algorithms described above can be investigated through simple simulation studies. These simulations again presume that a single sub-carrier within the transmission blocks is being considered. For simplicity, the sub-carrier in data block 1 and data block 3 are both chosen to have transmitted normalised magnitudes equal to that of $A_{20}$, such that $A_{10} = A_{30} = A_{20} = 1$. The true phase angles for the sub-carrier in data block 1 and data block 3 are chosen for simplicity to be $\phi_{10} = +45°$ and $\phi_{03} = -45°$, but could be any phase angle. The pilot control block data 2 sub-carrier is also chosen for simplicity to have a transmitted phase angle of $\phi_{20} = 0°$. For simplicity, it is also assumed that the received signals $X_1$, $X_2$ and $X_3$ have been received with a magnitude of 1, and have no noise or channel distortion.

Figure 10:
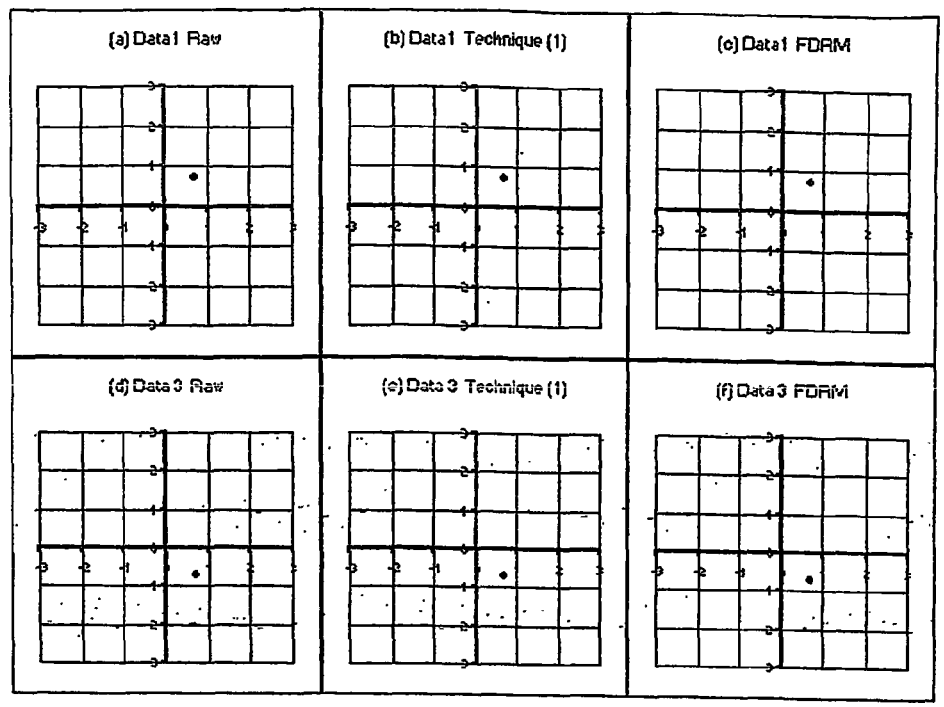
FIG. 10 is a series of simulated constellation plots for the three block transmission of FIG. 9, decoded using three different techniques, including the first method in which the invention is embodied, where the effects of channel distortion and noise are disregarded.
Figure 11:
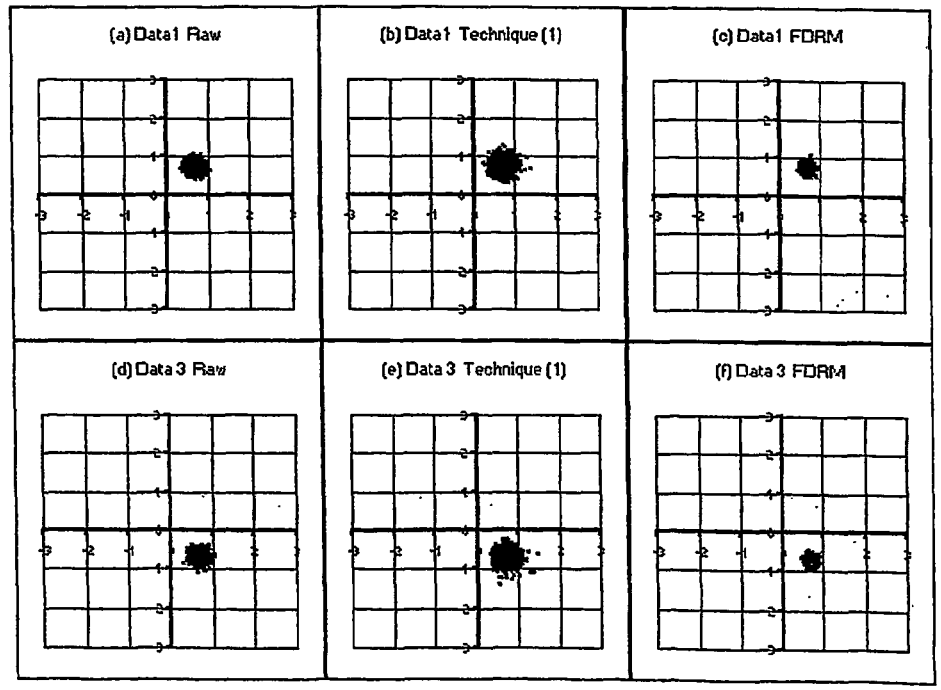
FIG. 11 is a series of simulated constellation plots calculated under conditions similar to those of FIG. 10, except in this case the effects of noise are taken into account and the transmitted amplitudes of the three blocks are normalised, i.e $A_{10}=A_{30}=A_{20}=1$.
Figure 12:
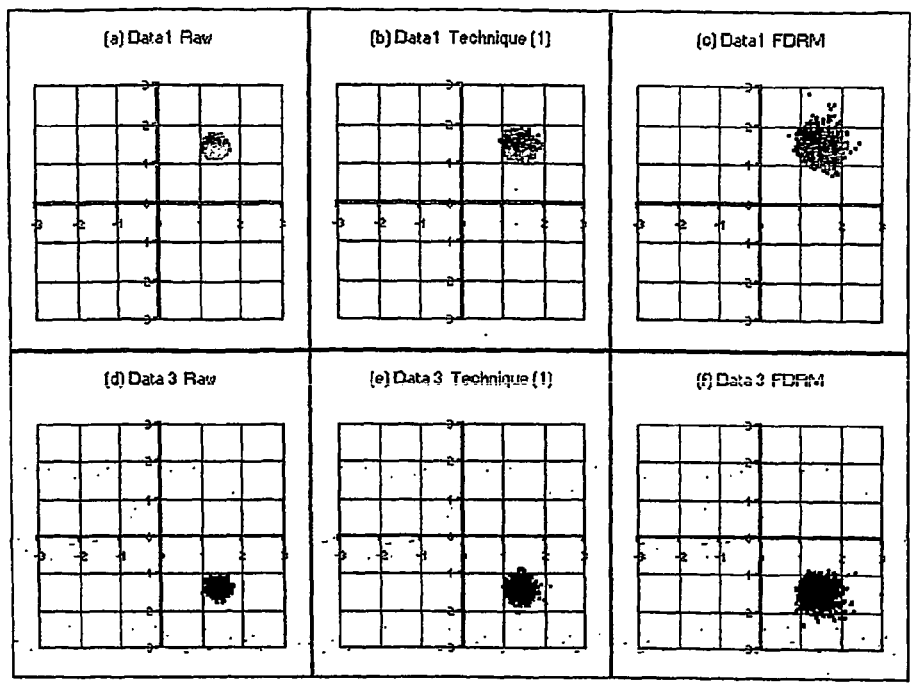
FIG. 12 is a series of simulated constellation plots for the three block transmission of FIG. 9, decoded using three different techniques, including the first method in which the invention is embodied, in the presence of noise, but no channel distortion, and where the transmitted amplitudes are all set to two, i.e. $A_{10}=A_{20}=A_{30}=2$.

FIGS. 10(a) to (f) show sub-carrier simulation studies for the conditions of no echo distortion and no noise, for both of the first and third data blocks. FIGS. 10(a) and 10(d) display the constellation plot diagrams for the raw received data $X_1$ and $X_3$ (defined as having no convolution encoding), which are simply decoded as received. FIGS. 10(b) and 10(e) show the application of the algorithms of the first method in which the invention is embodied, whilst FIGS. 10(c) and 10(f) show the application of FDRM transmission and FDRM decoding algorithms to the same sub-carrier data. As can be seen, all three applications for the estimation and thus the recovery of $A_{10}, \phi_{10}, A_{30}, \phi_{30}$ are in precise agreement with the true normalised values when there is no echo channel distortion and no noise present. It should be noted that application of the FDRM algorithms for this particular decoding situation required compensation to some of the data for the 180° phase ambiguity inherent in FDRM. This was not required for the algorithms of the first technique in which the invention is embodied, thus providing a simpler decoding strategy.

To simulate the noise introduced within a real life scenario, the same data was reproduced for 2000 sample points with a Gaussian noise variance of $\sigma=0.1$ present on each of the I and Q components of the received sub-carrier data and assuming that $A_{10}=A_{30}=A_{20}=1$. This noise could represent small uncorrelated random variations on channel distortion between the data blocks. FIGS. 11(a) to (f) display these simulated results for both the first and third data blocks. From this, it can be seen that the spread of values around the true normalised value for the first technique in accordance with the invention is slightly larger than the spread around the raw received data, whilst for FDRM it is slightly better than the raw data. The situation for FDRM is as expected, as basically the same data is being transmitted twice providing a $\sqrt{2}$ noise improvement over the raw uncorrected data. The first method in accordance with the invention produces an error spread, which is approximately $\sqrt{2}$ larger than the raw data, and two times larger than for FDRM.

The simulations of FIG. 11(a) to (f) are based on the assumption that $A_{10}=A_{30}=A_{20}=1$. However, in some modulation techniques, signal amplitudes may have to be transmitted as twice or three times the normalised value, for example in QAM. To investigate the influences of larger transmission amplitudes, the amplitudes can be set to twice the normalised value, i.e. $A_{10}=A_{30}=A_{20}=2$ with all phase angles remaining the same. The results in FIGS. 12(a) to (f) show that FDRM is more sensitive to amplitude increases, as now it has produced the largest error spread of the three techniques. This is a major weakness of FDRM. In this case it can be seen that the first technique in which the invention is embodied has much improved performance over FDRM, approximately a 1.5 times improvement. However, the scatter spread of the method of the first embodiment of the invention is still $\sqrt{2}$ larger than the raw data.

Figure 13:
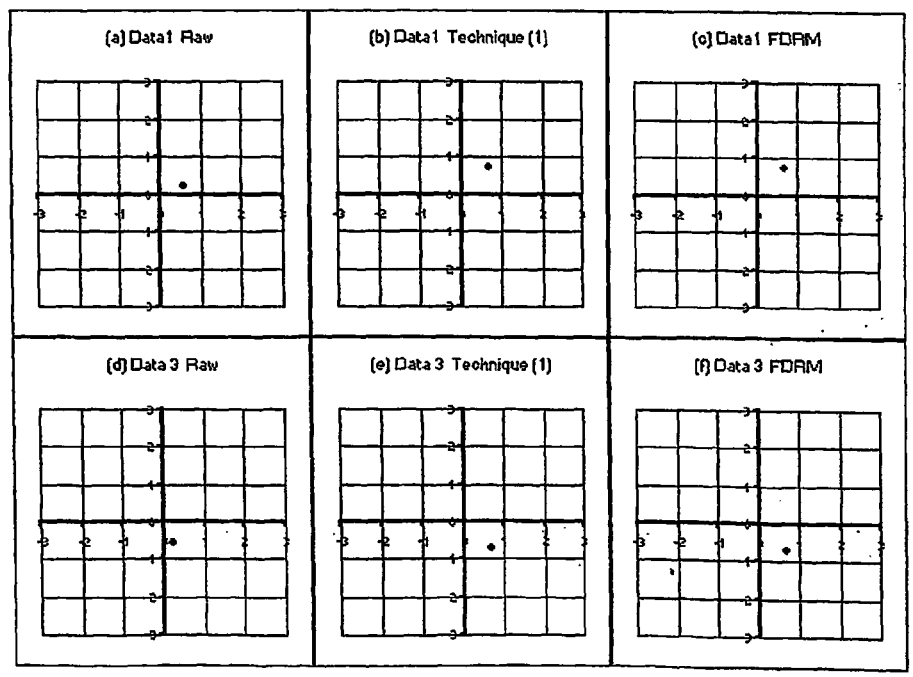
FIG. 13 is a series of simulated constellation plots for three different transmission techniques, including the first method in accordance with the invention, taking into account an echo, but no noise, and where $A_{10}=A_{20}=A_{30}=1$.

The effects of an echo distortion will now be considered. To do this, a signal echo with $a=0.5$ and phase angle $\phi_e=150°$ was added to the received sub-carrier data for the case of $A_{10}=A_{30}=A_{20}=1$. The results with no noise present are shown in FIGS. 13(a) to (f). FIGS. 13(a) and 13(d) show the raw scatter points for both data blocks 1 and 3. From these, it can be seen that data blocks 1 and 3 are not decoded onto the correct amplitudes and phase angles, resulting in decoding errors due to the presence of the channel echo signal. FIGS. 13(b) and 13(e) show the decoded values for data block 1 and data block 3 using the first technique in which the invention is embodied. It can be seen that this new technique removes completely channel distortion effects and decodes the correct data blocks onto the correct positions on the scatter plots. For comparison, FIGS. 13(c) and 13(f) show the application of FDRM transmission and decoding for sub-carriers data 1 and 3. It can be seen that this technique also is capable of eliminating completely echo channel distortion effects. However, in this scenario, compensation of 180° ambiguity has again been required for some of the FDRM algorithm data, otherwise two clusters would have appeared 180° apart. As noted before, this is one of the weaknesses of FDRM. It should also be noted that FDRM requires two data blocks per data block transmission, i.e. the normal data block and the reciprocal data block. Thus in this example, FDRM involves sending four data blocks rather than the three transmitted by the first embodiment of the invention. Hence, FDRM sends 1.333 times more data for the same result.

FIGS. 14(a) to (f) show simulations for the same data as used for FIGS. 13(a) to (f), but in this case Gaussian noise having a variance of $\sigma=0.1$ is introduced on each of the received I and Q values. FIGS. 14(a) and 14(d) show the raw data received, that is data 1 and data 3. As expected, the raw data is not correct due to the addition of the channel echo signal, with the average amplitude and phase angles in the scatter plots nowhere near the original transmitted values. From FIGS. 14(b) and 14(e) it can be seen that the scatter plots for the first technique in which the invention is embodied lie in the correct regions of the plot. Indeed, the average values are in agreement with the correct values for both data 1 and data 3. In FIGS. 14(c) and 14(f) the FDRM algorithms appear to provide a closer spread of data points around the true normalised values, after again, a 180° phase correction has been applied to some of the FDRM data points. In contrast, the method of the first embodiment of the invention has an error spread approximately twice that of the raw and FDRM scatter plots. However, these simulations are based on normalized amplitudes and, as noted previously, in practice this is unlikely to be the case. As a specific example, in QAM many amplitudes and phase angles can be transmitted.

Figure 14:
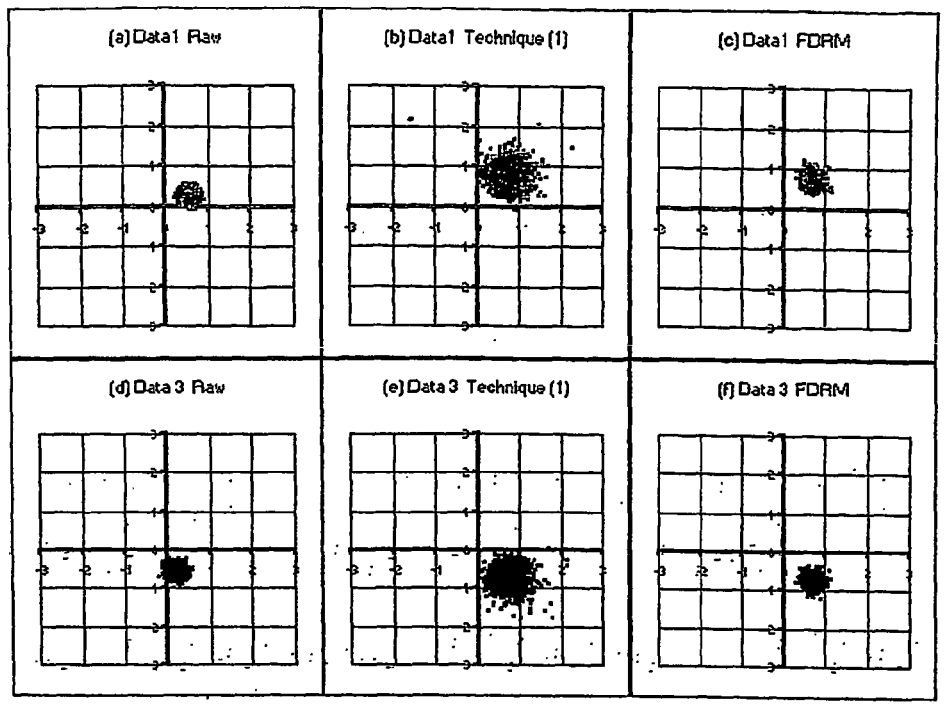
FIG. 14 is a series of simulated constellation plots for three different transmission techniques, including the first method in accordance with the invention, taking into account an echo and noise, and where $A_{10}=A_{20}=A_{30}=1$.
Figure 15:
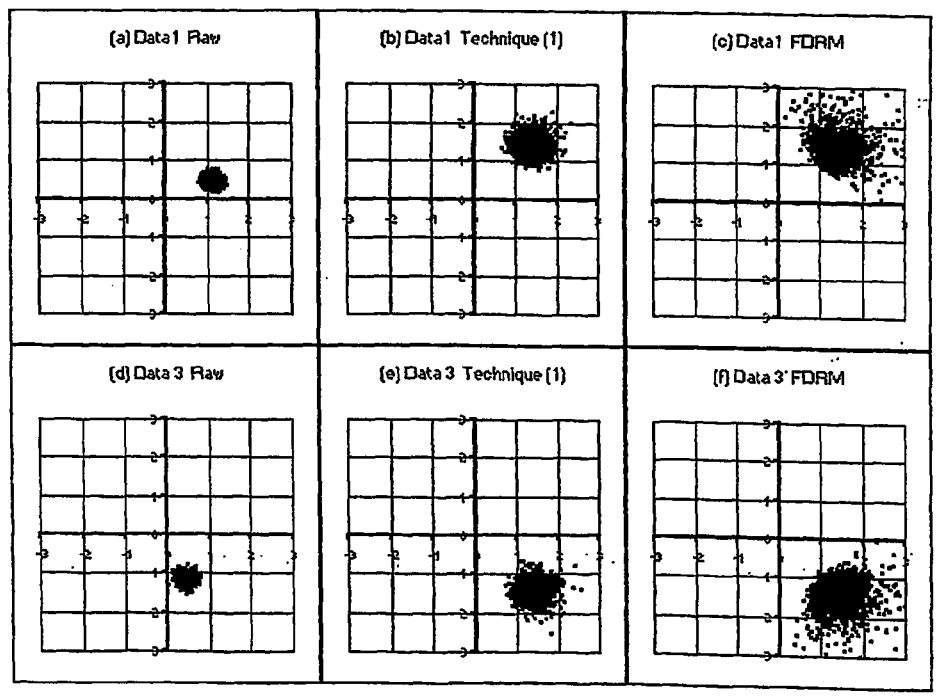
FIG. 15 is a series of simulated constellation plots determined under conditions similar to those of FIG. 14, except in this case $A_{10}=A_{20}=A_{30}=2$.

FIGS. 15(a) to (f) show simulation results for the case where $A_{10}=A_{20}=A_{30}=2$ with the same noise levels and echo as used for FIG. 14. From FIGS. 15(a) and (d), it can be seen that the average values of the raw data are still decoded incorrectly. However, from FIGS. 15(c) and (d) the spread around the true values for the first method in which the invention is embodied has decreased, improving the decoding power of the technique. In contrast, from FIGS. 15(c) and (f), it can be seen that FDRM produces a much poorer result, and the spread around the true values has deteriorated. This indicates that the FDRM algorithms provide reduced performance for larger amplitudes than any normalised values. In the case in question, the first technique actually provides only a 1.4 times larger spread in decoded phase angle estimation over the raw data. As the raw data is wrong, the larger error spread around the true position in the scatter plot is adequate compensation for the failure of the raw data in eliminating echo distortion which always produces an error in decoded scatter plot position. The above discussions and evaluations outline the reason why it has been suggested that a normalised amplitude of $A=1.333$ should not be exceeded in FDRM. If it is, then the scatter points take on significant distribution errors.

Although further improvement can be produced using the first technique in which the invention is embodied by increasing the amplitude of all the signals relative to the normalised value, some improvement can also be found by simply increasing the value of $A_{20}$. Increasing only the control sub-carrier data-block amplitude provides overall improvement to the system. For example, when $A_{10}$ and $A_{20}$ are both kept at 2, and $A_{20}=5$, slightly tighter scatter plots can be observed for the first decoding technique in which the invention is embodied. Indeed, for this situation, the spread in phase angle values is nearly identical to that of the received raw data with the channel distortion for this particular situation. The draw back is that increased control block amplitudes may give cause to distortion problems at the transmitter.

In summary, the first method in which the invention is embodied is superior to FDRM in situations where the variation of transmitted amplitudes on carrier frequency signals varies dramatically around a chosen normalised amplitude value in the presence of noise. In normal modem QAM scenarios, this is certainly the situation. This could also occur for some OFDM transmissions that employ FDRM using QAM transmission and decoding. In these situations, this first technique of the invention provides a tighter scatter plot in the presence of noise.

It will be appreciated that the first technique as described above could be implemented in a variety of standard scatter plot configurations such as Multilevel-QAM etc. However, there is no restriction on the type of scatter plot that may be used. Two examples are given in FIG. 16.

A second technique in which the invention is embodied will now be described. In a similar way to the first technique, N data blocks are transmitted sequentially with the same echo channel distortion H presumed to exist for the duration of the N block transmissions. Again a data block k is embedded somewhere in the stream as a pilot control data block for decoding purposes with known normalised true quadrature values given by:

$$I_{km0}=A_{km0}\cos\phi_{km0} \text{ and } Q_{km0}=A_{km0}\sin\phi_{km0}$$

In addition, as in the first technique, the phase angles of the original data blocks are convoluted with the control data block phase angle, and embedded in the transmitted data blocks. However, in this case this is done in a different way, as detailed in FIG. 17. Here, it is assumed that the actual data to be transmitted for each of the N Blocks of M sub-carriers is given by:

$$\text{Data in Block } n \text{ subcarrier } m = A_{nm0}\exp(j\phi_{nm})(n\neq k)$$

The general encoding of the transmitted data for N data blocks using the second technique is defined for each sub-carrier m as follows:

$$X_{1m0} = I^c_{1m0} + jQ^c_{1m0} =$$
$$A_{1m0}\exp(j(\alpha_{1m}\phi_{1m0} - \alpha_{2m}\phi_{2m0} - \alpha_{3m}\phi_{3m0} - \ldots - \alpha_{Nm}\phi_{Nm0}))$$

$$X_{2m0} = I^c_{2m0} + jQ^c_{2m0} =$$
$$A_{2m0}\exp(j(\alpha_{2m}\phi_{2m0} - \alpha_{1m}\phi_{1m0} - \alpha_{3m}\phi_{3m0} - \ldots - \alpha_{Nm}\phi_{Nm0}))$$
$$\vdots$$

$$X_{km0} = I^c_{km0} + jQ^c_{km0} =$$
$$A_{km0}\exp(-j(\alpha_{1m}\phi_{1m0} - \alpha_{2m}\phi_{2m0} - \alpha_{3m}\phi_{3m0} + \ldots + \alpha_{Nm}\phi_{Nm0}))$$
$$\vdots$$

$$X_{Nm0} = I^c_{Nm0} + jQ^c_{Nm0} =$$
$$A_{Nm0}\exp(j(\alpha_{Nm}\phi_{Nm0} - \alpha_{1m}\phi_{1m0} - \alpha_{2m}\phi_{2m0} - \ldots - \alpha_{(N-1)m}\phi_{(N-1)m0}))$$

In this case, the actual data blocks have a convoluted phase angle comprising the subtraction of all the other transmitted (N-1) data block phase angles, which use the same sub-carrier. The control data block has a phase angle that is simply the addition of all the sub-carrier data block phase angles. The terms $\alpha_{nm}$ (n=1, 2 ... N) are constants associated with the convolution of each encoded phase angle on the sub-carrier. The above encoding algorithms for each sub-carrier can be re-written in the form:

$$X_{nm0} = I^c_{nm0} + jQ^c_{nm0} = A_{nm0}\exp\left(j\left(2\alpha_{nm}\phi_{nm0} - \sum_{n=1(n\neq k)}^{N}\alpha_{nm}\phi_{nm0}\right)\right)(n\neq k)$$

$$X_{km0} = I^c_{km0} + jQ^c_{km0} = A_{km0}\exp\left(-j\left(\sum_{n=1(n\neq k)}^{N}\alpha_{nm}\phi_{nm0}\right)\right)$$

As will be appreciated, even though the amplitudes of the pilot symbol sub-carriers can be increased, the pilot control data block now has a more random assignment of phase angles across all sub-carriers. This arises because each sub-carrier of the pilot control data block requires the addition of all phase angles from the same sub-carriers in all the transmitted data blocks. The effect of this is to randomly assign pilot control data block sub-carrier phase angles dependent on the data being transmitted, resulting in a reduced crest factor simply by design and not by external assignment of random carrier phases.

At the receiver, the coherent detector provides a measure of the convoluted I and Q values, which have now been affected through channel distortion. These are denoted by:

$$X_{nm} =$$
$$I_{nm} + jQ_{nm} = A_{nm0}\exp\left(j\left(2\alpha_{nm}\phi_{nm0} - \sum_{n=1(n\neq k)}^{N}\alpha_{nm}\phi_{nm0}\right)\right)A_{att}H(n\neq k)$$

$$X_{km} = I_{km} + jQ_{km} = A_{km0}\exp\left(-j\left(\sum_{n=1(n\neq k)}^{N}\alpha_{nm}\phi_{nm0}\right)\right)A_{att}H$$

The transmission of the sub-carriers within the N blocks may, as before, be represented as the following transmission sequence, viz:

| Data Block 1 | Data Block 2 | | Pilot Control Data Block k | | Data Block N |
|---|---|---|---|---|---|
| $\begin{bmatrix} X_{110} \\ X_{120} \\ \ldots \\ \ldots \\ \ldots \\ X_{1M0} \end{bmatrix}$ | $\begin{bmatrix} X_{210} \\ X_{220} \\ \ldots \\ \ldots \\ \ldots \\ X_{2M0} \end{bmatrix}$ | $\ldots$ | $\begin{bmatrix} X_{k10} \\ X_{k20} \\ \ldots \\ \ldots \\ \ldots \\ X_{kM0} \end{bmatrix}$ | $\ldots$ | $\begin{bmatrix} X_{N10} \\ X_{N20} \\ \ldots \\ \ldots \\ \ldots \\ X_{NM0} \end{bmatrix}$ |

Decoding is achieved in a similar way to the first technique by dividing the received sub-carrier signals by the received sub-carrier pilot control block k signals. This results in the following:

$$\frac{X_{nm}}{X_{km}} = \frac{(I_{nm} + jQ_{nm})}{(I_{nm} + jQ_{km})} = \frac{A_{nm0}\exp\left(j\left(2\alpha_{nm}\phi_{nm0} - \sum_{n=1(n\neq k)}^{N}\alpha_{nm}\phi_{nm0}\right)\right)A_{att}H}{A_{km0}\exp\left(-j\left(\sum_{n=1(n\neq k)}^{N}\alpha_{nm}\phi_{nm0}\right)\right)A_{att}H} =$$

$$\frac{A_{nm0}}{A_{km0}}\exp(j2\alpha_{nm}\phi_{nm0})$$

In terms of measured $I_{nm}$ and $Q_{nm}$ values, then $$\frac{(I_{nm} + jQ_{nm})}{(I_{nm} + jQ_{km})} =$$

$$\frac{(I_{nm}I_{km} + Q_{nm}Q_{km}) + j(I_{km}Q_{nm} - I_{nm}Q_{km})}{(I_{km}^2 + Q_{km}^2)} = \frac{A_{nm0}}{A_{km0}}\exp(j2\alpha_{nm}\phi_{nm0})$$

It is easy to show that estimates of the true normalised amplitudes and phase angles for each original set of data which has been encoded using the second technique are given by:

$$\hat{A}_{nm} = A_{km0}\sqrt{\left[\frac{I_{nm}^2 + Q_{nm}^2}{I_{km}^2 + Q_{km}^2}\right]} \quad n = 1, 2, \ldots N \quad n \neq k$$

$$\hat{\phi}_{nm} = \frac{1}{2\alpha_{nm}}\tan^{-1}\left[\frac{I_{km}Q_{nm} - I_{nm}Q_{km}}{I_{nm}I_{km} + Q_{nm}Q_{km}}\right] \quad n = 1, 2, \ldots N \quad n \neq k$$

Estimates of the true I and Q components of the original true unconvoluted data may again be evaluated from:

$$\hat{I}_{nm} = A_{km0}\frac{(I_{nm}I_{km} + Q_{nm}Q_{km})}{(I_{km}^2 + Q_{km}^2)} = \hat{A}_{nm}\cos\hat{\phi}_{nm} \quad n = 1, 2, \ldots N \; (n \neq k)$$

$$\hat{Q}_{nm} = A_{km0}\frac{(I_{km}Q_{nm} - I_{nm}Q_{km})}{(I_{km}^2 + Q_{km}^2)} = \hat{A}_{nm}\sin\hat{\phi}_{nm} \quad n = 1, 2, \ldots N \; (n \neq k)$$

An estimate of the channel response of each sub-carrier can be determined once the values of $\phi_{nm0}$(n=1, 2, ... N (n≠k) have been recovered. This is obtained through $$A_{att}H = \frac{X_{km}}{A_{km0}\exp\left(-j\left(\sum_{n=1(n\neq k)}^{N}\alpha_{nm}\phi_{nm0}\right)\right)}$$

where of course $A_{km0}$ is already defined. As in the first technique, the receiver does not need to know anything about the original phase angles of the pilot control sub-carriers in order to decode the original unconvoluted data. In this case, the % DBR (Data Block Reduction) over FDRM is identical to that in the first technique as the same number of data blocks is transmitted in both techniques. Thus:

$$DBR_{Technique\,(2)} = \frac{Data\; Blocks_{Technique\,(2)}}{Data\; Blocks_{FDRM}} = \left(1 - \frac{N}{2(N-1)}\right) \times 100\,\%$$

Figures 16, 17, 18:
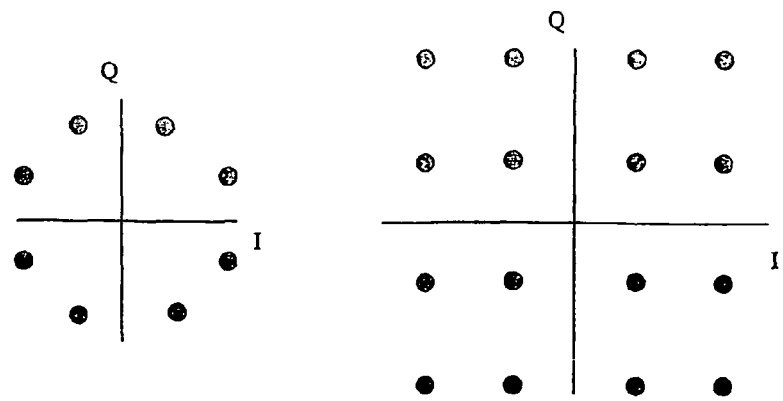
FIG. 16 is a diagrammatic representation of two normalised scatter diagrams, which could be used to decode data transmitted in accordance with a first method in which the invention is embodied.
FIG. 17 is a diagrammatic representation of a transmitted sequence of N-data blocks, in which a pilot control data-block k is inserted.
FIG. 18 is a diagrammatic representation of a transmitted sequence of N-data blocks, where N=3 and k=2.

Specific examples of the second encoding and decoding methods in which the invention is embodied will now be described. Taking the same example as used previously, three sequentially transmitted data blocks are considered. As before, data block 1 and data block 3 are the data blocks, and data block 2 is the control data block, as shown in FIG. 18. Thus, in this case N=3, and k=2. It is also assumed for simplicity that $A_{10}=A_{20}=A_{30}=1$. For the three block transmission, the % DBR for the second technique in which the invention is embodied is 25%. Again for simplicity, only one of the sub-carriers in all three data blocks will be considered for simulation. The original data to be transmitted onto the sub-carriers may as before be expressed as:

Data $1 = I_{10} + jQ_{10}$

Data $3 = I_{30} + jQ_{30}$

The true pilot control data for the sub-carrier of data block 2 is given by:

Data $2 = I_{20} + jQ_{20}$

After convolution, the data placed onto the sub-carriers becomes:

$X_{10} = I_{10}^c + jQ_{10}^c = A_{10}\exp(j(\phi_{10} - \phi_{30}))$ $X_{20} = I_{20}^c + jQ_{20}^c = A_{20}\exp(-j(\phi_{10} + \phi_{30}))$ $X_{30} = I_{30}^c + jQ_{30}^c = A_{30}\exp(j(\phi_{30} - \phi_{10}))$ The received signals once measured by a coherent detector include the effects of channel distortion. The measured signals are given by:

$X_1 = I_1 + jQ_1 = A_{10}\exp(j(\phi_{10} - \phi_{30}))A_{att}H$ $X_2 = I_2 + jQ_2 = A_{20}\exp(-j(\phi_{10} + \phi_{30}))A_{att}H$ $X_3 = I_3 + jQ_3 = A_{30}\exp(j(\phi_{30} - \phi_{10}))A_{att}H$ Estimates of the true normalised values are found through:

$$\hat{A}_1 = A_{20}\sqrt{\left[\frac{I_1^2 + Q_1^2}{I_2^2 + Q_2^2}\right]} \quad \hat{\phi}_1 = \frac{1}{2}\tan^{-1}\left[\frac{I_2Q_1 - I_1Q_2}{I_1I_2 + Q_1Q_2}\right]$$

$$\hat{I}_1 = \hat{A}_1\cos\hat{\phi}_1 \qquad \hat{Q}_1 = \hat{A}_1\sin\hat{\phi}_1$$

$$\hat{A}_3 = A_{20}\sqrt{\left[\frac{I_3^2 + Q_3^2}{I_2^2 + Q_2^2}\right]} \quad \hat{\phi}_3 = \frac{1}{2}\tan^{-1}\left[\frac{I_2Q_3 - I_3Q_2}{I_3I_2 + Q_3Q_2}\right]$$

$$\hat{I}_3 = \hat{A}_3\cos\hat{\phi}_3 \qquad \hat{Q}_3 = \hat{A}_3\sin\hat{\phi}_3.$$

This technique can be evaluated with the same sub-carrier data as used in the first technique, that is normalised sub-carrier amplitudes in the transmitting scatter plot diagram given by $A_{10}=A_{30}=A_{20}=1$, phase angles given by $\phi_{10}=+45°$; $\phi_{30}=-45°$; $\phi_{20}=0°$, and a channel echo with a=0.5, and $\phi_e=150°$. It is again assumed that the received sub-carrier signals without channel distortion have a magnitude of 1.

The plots for the situation of no channel distortion and no noise are shown in FIGS. 19(a) to (f). The performance with no channel echo distortion and no noise is identical to that for the first technique with the same conditions, see FIGS. 10(a) to (f). As expected the raw data, the second technique and FDRM provide identical results.

In order to test the effect of noise, Gaussian noise with a variance of σ=0.1 is introduced to the I and Q received values again to introduce independent variations of channel effects between all three data blocks. The results of 2000 scatter points are plotted in FIGS. 20(a) to (f). When this is done, the second technique has the same problem as FDRM, namely that there is a phase ambiguity of 180° for some of the decoded points. This has been compensated for in the plots in FIG. 20. In order to alleviate this problem pilot tone carriers or alternative constellation methods similar to FDRM are required. In addition, the phase angle spread is identical to that of FDRM, thus for phase angle modulation and demodulation the second technique and FDRM are similar in performance. However, both the second technique and FDRM provide better phase angle determination than the raw data. In addition, the second technique of the invention involves the transmission of one less data block than FDRM for the same result thus improving data throughput. This improvement in throughput increases significantly when more data blocks are used. For example, if four real data blocks had to be transmitted, the second method in which the invention is embodied would involve the transmission of a total of five data blocks comprising four data blocks and one control data block. In contrast, FDRM would require the transmission of eight data blocks. Thus, for this situation, the second technique in which the invention is embodied provides a 37.5% improvement in DBR over FDRM. A further observation on the plots of FIG. 20 is that the amplitude spread for the second technique is larger than for FDRM.

Figure 19:
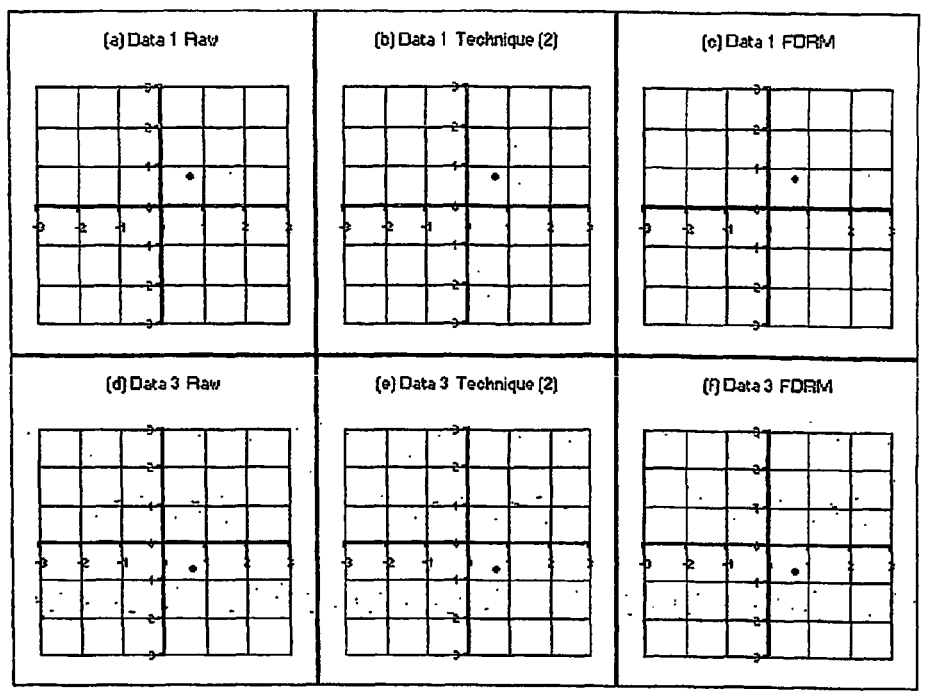
FIG. 19 is a series of simulated constellation plots for the three block transmission of FIG. 18, decoded using three different techniques, including a second method in which the invention is embodied, where the effects of channel distortion and noise are disregarded.
Figure 20:
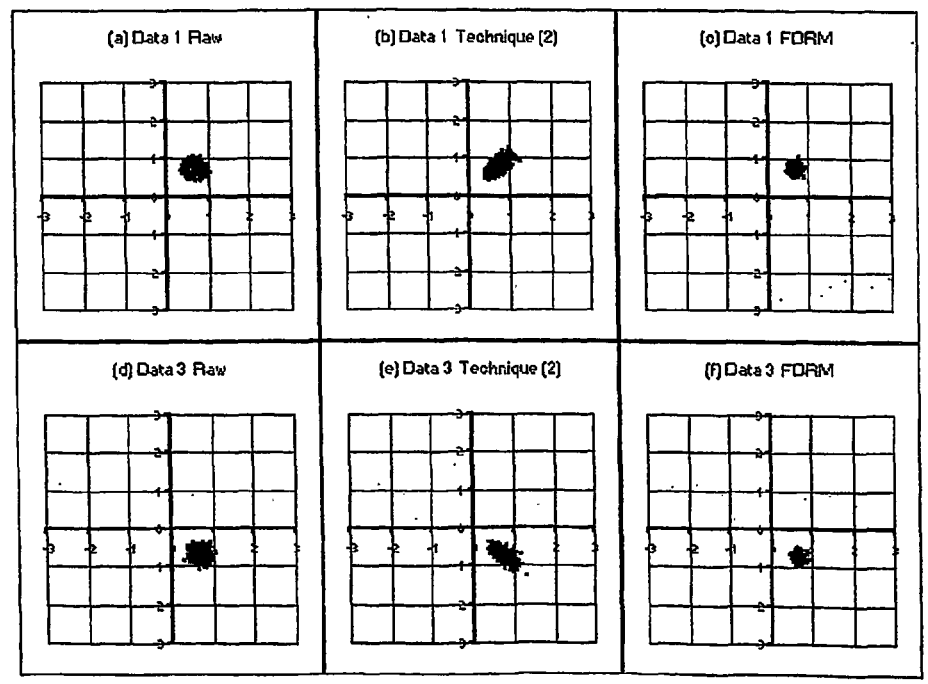
FIG. 20 is a series of simulated constellation plots for the three-block transmission of FIG. 18, decoded using the same techniques as for FIG. 19, where echo distortion is disregarded, but noise is taken into account and the transmitted amplitudes are normalized, i.e. $A_{10}=A_{20}=A_{30}=1$.
Figure 21:
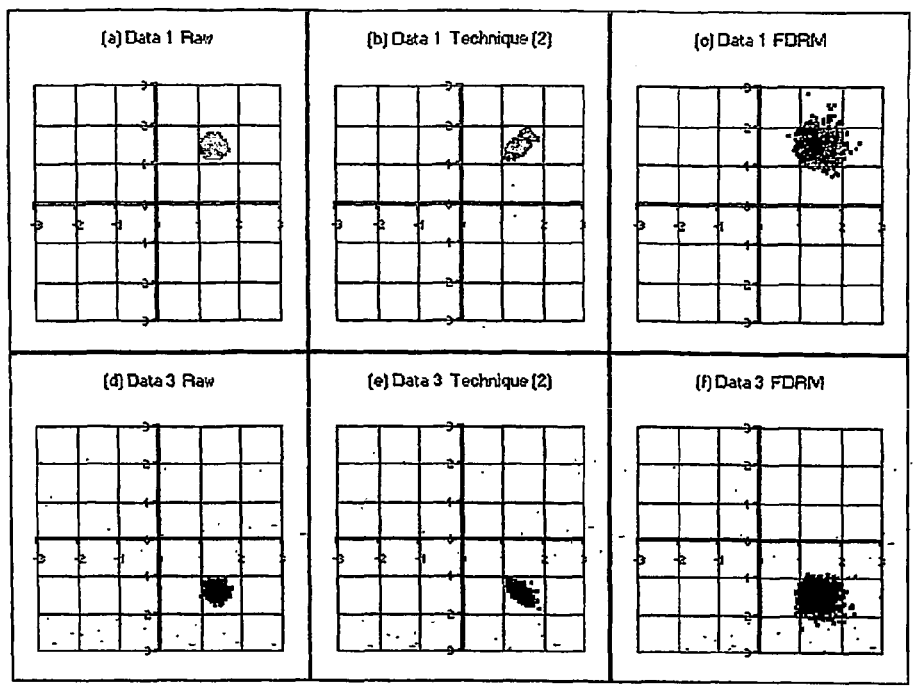
FIG. 21 is a series of simulated constellation plots for the three block transmission of FIG. 18, determined using conditions similar to those for FIG. 20, except that the transmitted amplitudes are set at two, i.e. $A_{10}=A_{30}=A_{20}=2$.
Figure 22:
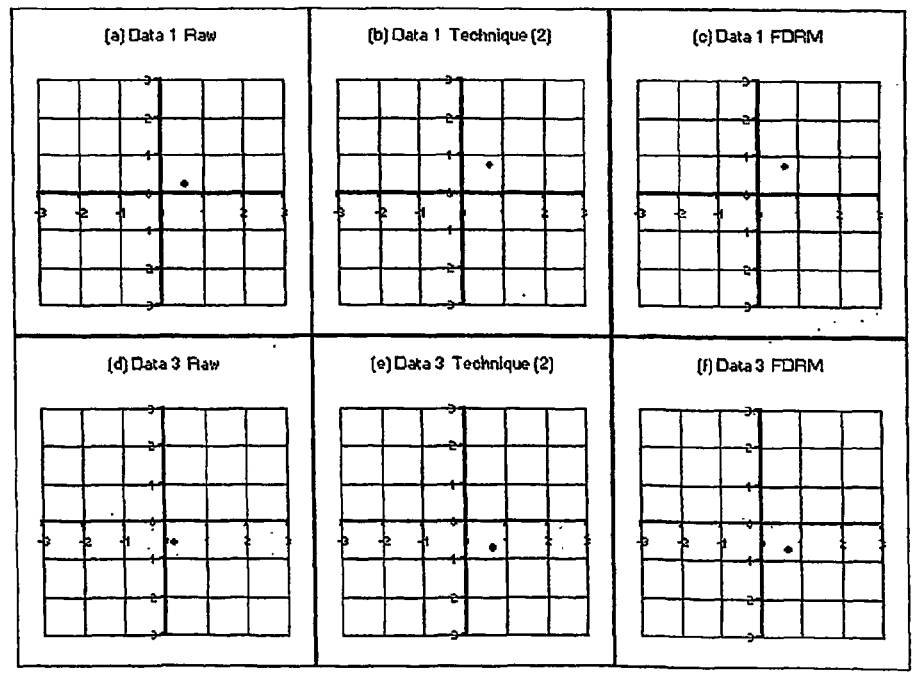
FIG. 22 is a series of simulated constellation plots for the three block transmission of FIG. 18, decoded using the same techniques as for FIG. 19, where noise is disregarded, but an echo is taken into account and the transmitted amplitudes are normalized, i.e. $A_{10}=A_{20}=A_{30}=1$.
Figure 23:
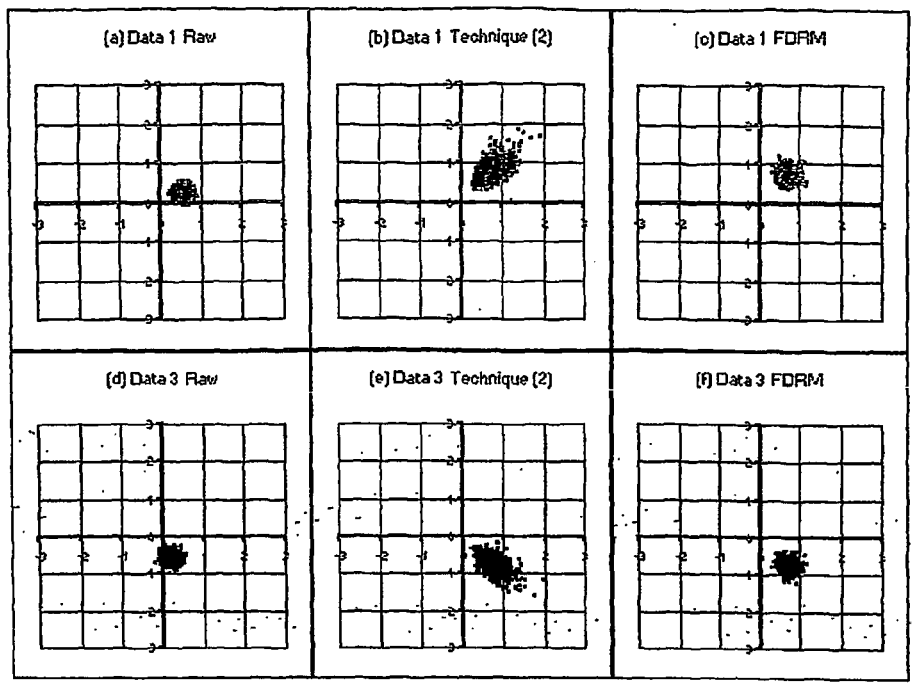
FIG. 23 is a series of simulated constellation plots for the three block transmission of FIG. 18, decoded using the same techniques as for FIG. 19, but where noise and an echo are taken into account and the transmitted amplitudes are normalized, i.e. $A_{10}=A_{20}=A_{30}=1$.
Figure 24:
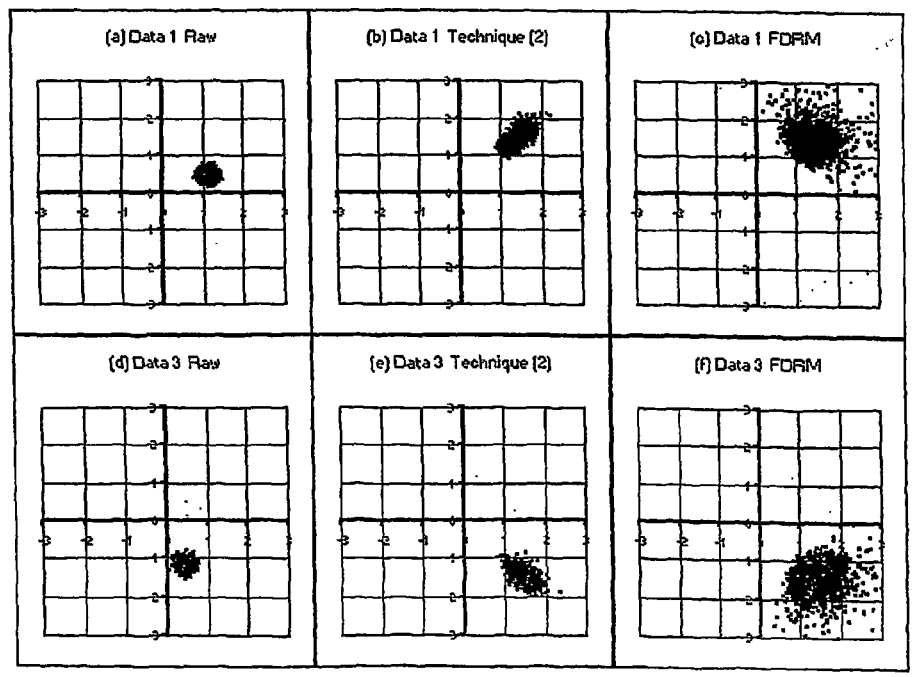
FIG. 24 is a series of simulated constellation plots determined under conditions similar to those of FIG. 23, but where the transmitted amplitudes are set to two, i.e. $A_{10}=A_{30}=A_{20}=2$.

The simulations of FIGS. 19 and 20 were determined using a normalised amplitude. However, if QAM is used for the transmission, the transmitted amplitudes require to be larger than the normalised value. Simulated plots for the transmission of FIG. 18 are shown in FIGS. 21(a) to (f) for the case where the amplitudes are equal to twice the normalised value, i.e. $A_{10}=A_{20}=A_{30}=2$, and the phase angles are the same as used before. It is immediately obvious from these that the second technique of the invention provides superior results compared to FDRM in both amplitude and phase angle spread on the scatter plots. In fact, in this scenario, the phase angle spread of the second technique is $\sqrt{2}$ better than the raw data with no echo channel distortion, and also approximately three times better than FDRM. The situation over FDRM is further improved by simply increasing the amplitudes in relation to the normalised amplitude, since the signal-to-noise ratios are improve for the raw data and the second technique in accordance with the invention. However, they depreciate for FDRM. The situation can be improved slightly more by simply increasing $A_{20}$.

FIGS. 22(a) to (f) show further simulations for the data transmission of FIG. 18. In this case, the transmission amplitudes are normalized, i.e. $A_{10}=A_{20}=A_{30}=1$, and the phase angles are the same as before. In addition, an echo signal is added to the received data with identical values as before, i.e. a=0.5 with phase angle $\phi_e$=150°, but noise is disregarded. The results shown in FIG. 22 are identical to those for the first technique under the same conditions. Here, the raw signals indicate an error on decode as their positions on the scatter plots are removed in amplitude and phase angle from the true values. The second technique in which the invention is embodied and FDRM are both able to remove completely the effects of the channel echo. However, the second technique achieves it whilst sending fewer data blocks than FDRM.

To investigate again the influnces of noise over and above the constant echo distortion, Gaussian noise with a value of σ=0.1 was added to the received I and Q components. The resulting graphs are shown in FIGS. 23(a) to (f). From these, it can be seen that the performance of the second technique is again identical to FDRM in phase angle spread on the scatter diagram. In addition, the phase angle spread of the second technique is $\sqrt{2}$ better than the received raw data. This is again very valuable, as the raw data is clearly in error. The amplitude spread of the second technique is however larger than that for FDRM.

The situation of increased amplitude in relation to the normalised value can again now be considered for the QAM case, with for example, $A_{10}=A_{30}=A_{20}=2$. The simulation results for this situation are shown in FIGS. 24(a) to (f). From these it can be seen that the effects of echo distortion are still being compensated for, but in this case the phase angle scatter is $\sqrt{2}$ better than the raw data which is in error, and three times better than FDRM. The amplitude variation is also smaller than FDRM. Thus, in general, the second technique in which the invention is embodied performs better than FDRM in QAM type systems in combined elimination of channel echo distortion, and producing reduced error scatter plots on decoded constellation diagrams. In addition, both phase angle and amplitude scatter spread in the presence of noise in QAM type modulation systems is much improved over FDRM when the amplitude of the transmitted values is two, three or four times greater than the smallest amplitude transmitted. Also, the second method of the invention requires the transmission of fewer data blocks than FDRM. In OFDM, where the original amplitudes of the transmitted and received components within the transmission vary dramatically around an expected normalised value, then the second technique provides a better modulation technique in terms of improved scatter spread on the constellation diagram.

An interesting situation occurs for the condition $A_{10}=A_{20}=A_{30}=1$. Since $\sqrt{1}=1$, then the second technique decoding amplitude algorithm can be adapted or modified in order to take the square root of the decoded amplitude. In this situation the modified amplitude algorithm becomes:

$$\hat{A}_{nm} = A_{km0} \sqrt{\left[\frac{(I_{nm}^2 + Q_{nm}^2)^{1/2}}{(I_{km}^2 + Q_{km}^2)^{1/2}}\right]} \quad n = 1, 2, \ldots N \; n \neq k$$

Figure 25:
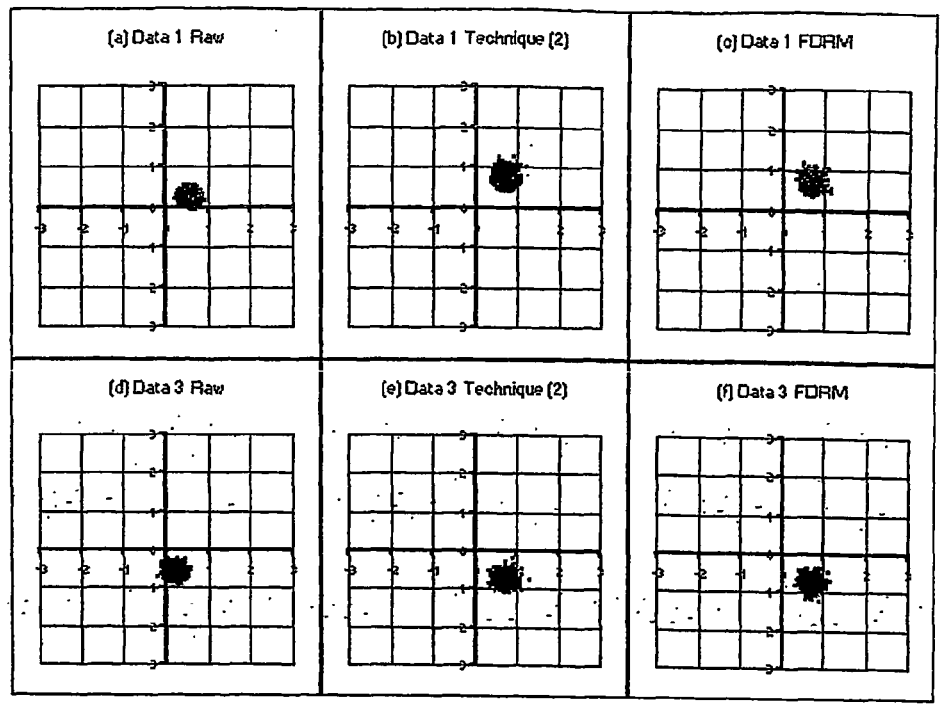
FIG. 25 is a series of simulated constellation plots for the three block transmission of FIG. 18, decoded using a modified version of the technique used for the plots of FIG. 19, where the transmitted amplitudes are normalized, i.e. $A_{10}=A_{20}=A_{30}=1$.

This is identical to the FDRM amplitude algorithm with normalized $A_{10}=A_{20}=A_{30}=1$. Simulation results are shown in FIG. 25 with the same echo and noise as described above. The amplitude variations have now been reduced in comparison to those of FIG. 23. However, it can be seen that an identical performance of the modified second technique with FDRM has been achieved, even although this modified second technique has sent less data blocks than FDRM. This improvement arises because of the novelty of using a control data block convoluted with the data.

Figure 26:
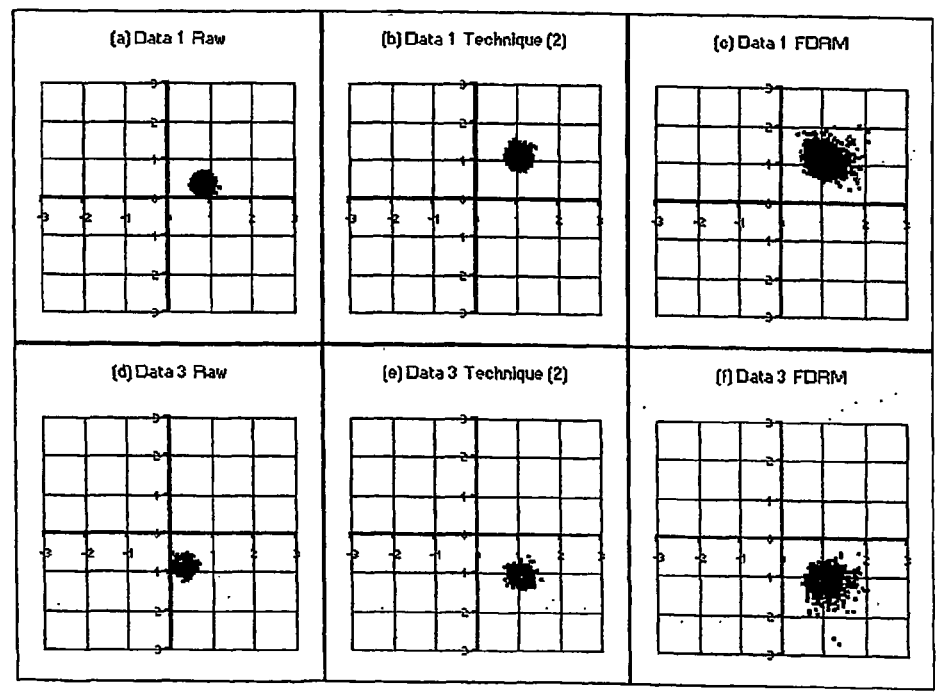
FIG. 26 is a series of simulated constellation plots determined using conditions similar to those used for the plots of FIG. 25, except where the transmitted amplitudes are set to 1.5, i.e. $A_{10}=A_{30}=A_{20}=1.5$.
Figure 27:
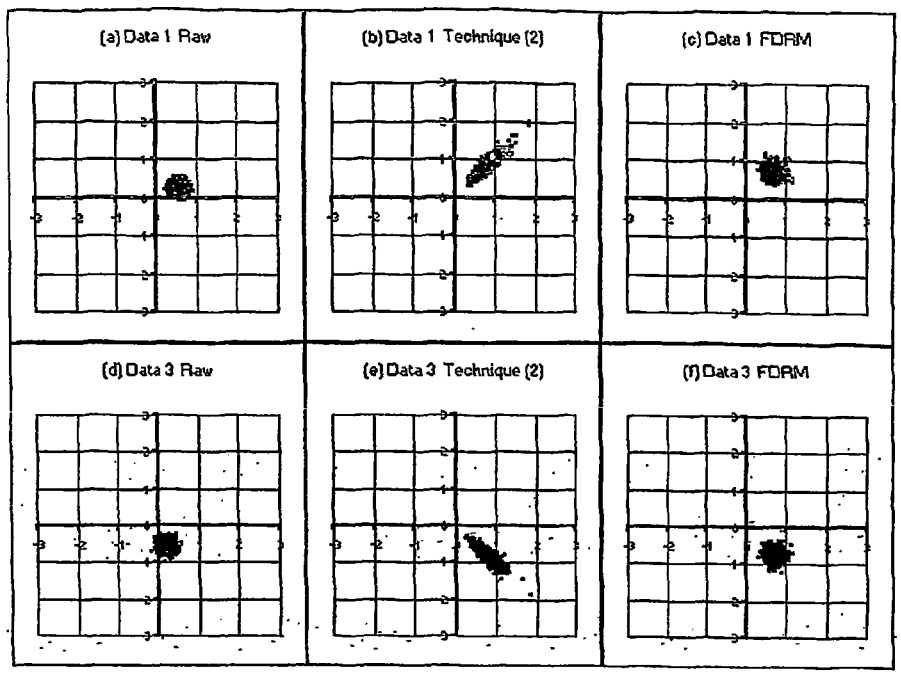
FIG. 27 is a series of simulated constellation plots determined using conditions similar to those used for the plots of FIG. 25, except where $\alpha_{nm}=2$.
Figure 28:
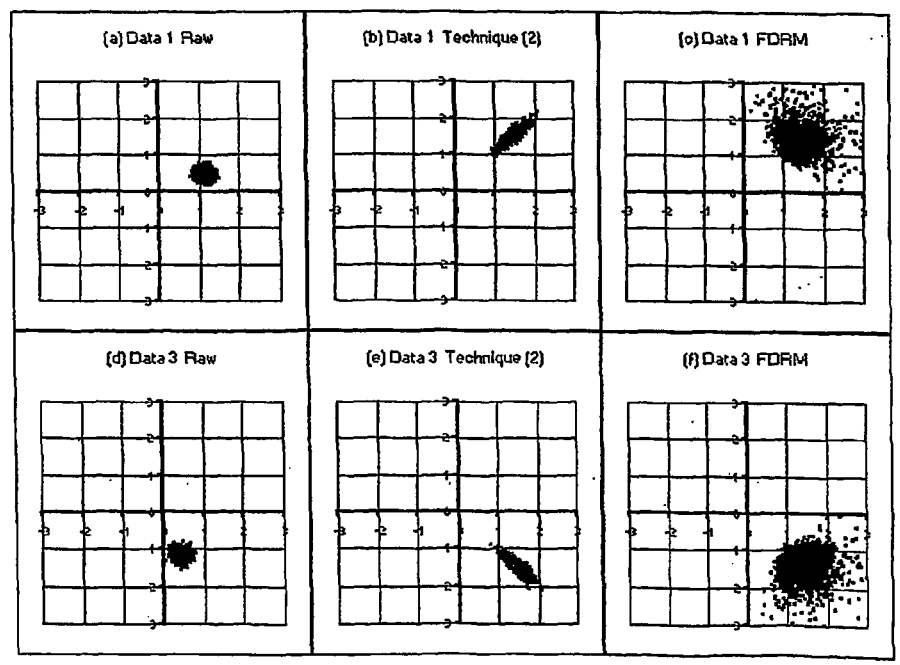
FIG. 28 is a series of simulated constellation plots determined using conditions similar to those used for the plots of FIG. 25, except where $\alpha_{nm}=2$ and $A_{10}=A_{30}=A_{20}=2$.

Investigation of the sensitivity of the amplitude decode can be made for transmitted values that are greater than 1.0. This may arise due to frequency non-linearity within the transmission system. Simulated results for transmitted amplitudes $A_{10}=A_{30}=A_{20}=1.5$ are shown in FIG. 26. These results show that any unwanted large variation above 1.0 is not as sensitive to scatter spread within the modified second technique as compared to FDRM. Even though the amplitude should be 1, non-linearities increase it, but the phase angle spread is reduced thus improving the technique over FDRM in terms of phase angle estimation. This is an important advantage over FDRM.

The same data can be decoded using the second technique with different values of $\alpha_{nm}$. As an example the same data above can be encoded and decoded with $\alpha_{nm}=2$, such that the sub-carrier algorithms become:

$$\hat{A}_{nm} = A_{km0} \sqrt{\left[\frac{(I_{nm}^2 + Q_{nm}^2)^{1/2}}{(I_{km}^2 + Q_{km}^2)^{1/2}}\right]} \quad n = 1, 2, \ldots N \; n \neq k$$

-continued $$\hat{\phi}_{nm} = \frac{1}{4}\tan^{-1}\left[\frac{I_{km}Q_{nm} - I_{nm}Q_{km}}{I_{nm}I_{km} + Q_{nm}Q_{km}}\right] n = 1, 2, \ldots N \; n \neq k$$

FIGS. 27(a) to (f) show the decoding results for the case where the transmitted amplitudes are normalised, i.e. $A_{10}=A_{30}=A_{20}=1$, $\alpha_{nm}=2$, and the received amplitudes are equal to one, with the same levels of noise as before, but no constant channel echo. From FIG. 27, it can be seen that the modified second technique has again eliminated channel echo, and in this situation also improved the spread in phase angle by a factor of around two times over FDRM. However, a phase ambiguity resolution of 180° has been applied to some of the data in both the second technique and FDRM. To eliminate this, the presence of pilot carriers, and/or asymmetric scatter plots may again be required.

Figure 29:
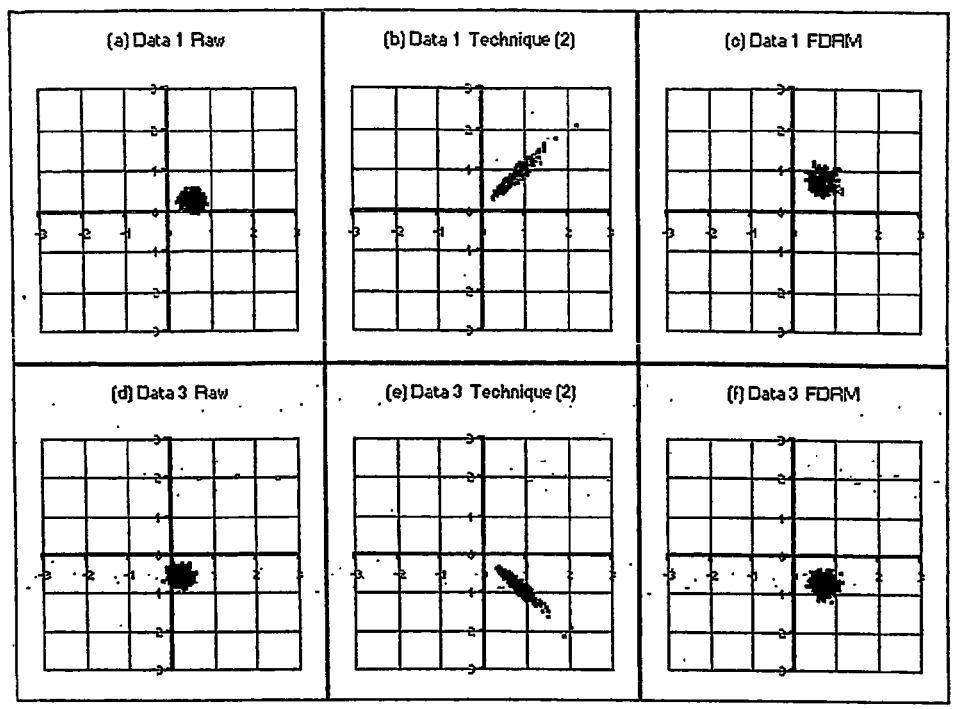
FIG. 29 is a series of simulated constellation plots determined using conditions similar to those used for the plots of FIG. 25, except where $\alpha_{nm}=3$.
Figure 30:
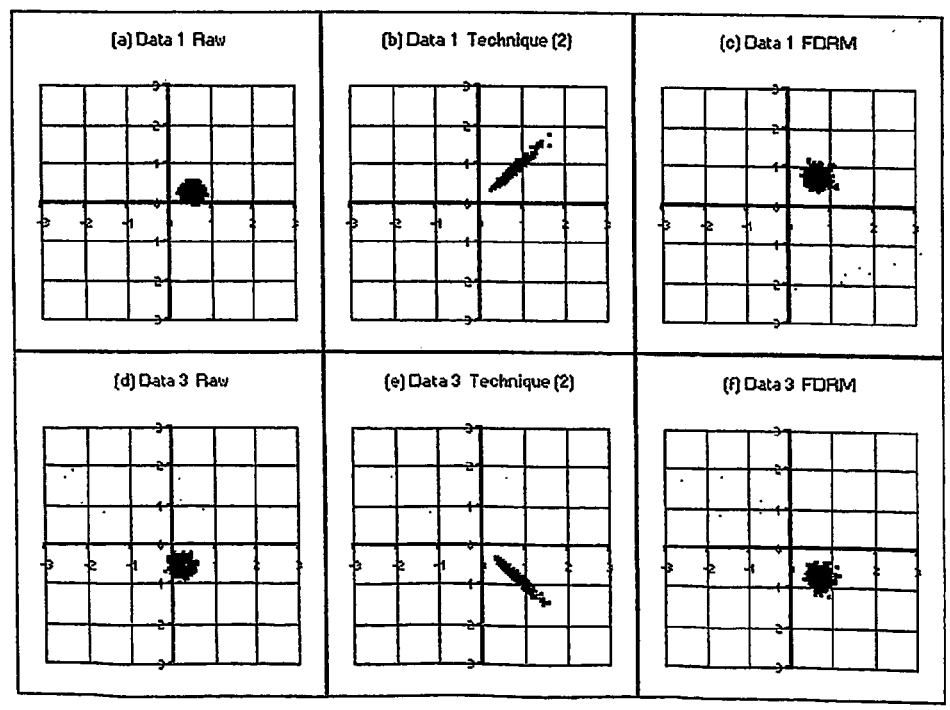
FIG. 30 is a series of simulated constellation plots determined using conditions similar to those used for the plots of FIG. 25, except where $\alpha_{nm}=4$.

Increasing the amplitudes such that $A_{10}=A_{20}=A_{30}=2$ again further improves the situation for the modified second technique in accordance with the invention, but not for the case of FDRM as can be seen in FIGS. 28(a) to (f). Here, the spread in both phase angle and amplitude is more severe for FDRM than for the second technique. Clearly, the improved phase angle estimation has very important implications for phase angle techniques. The effect of increasing $\alpha_{nm}$ to 3 and 4 can be seen in FIGS. 29 and 30 respectively, where it has become more apparent that the phase angle resolution has been improved even more dramatically for the case with $A_{10}=A_{20}=A_{30}=1$. However, the 180° phase ambiguity has also been compensated for in these diagrams, noting that the compensation mechanism is different in each case and may be more complex to implement in general. Asymmetric scatter plots or pilot carriers should help the decoding process.

It is expected that $\alpha_{nm}=1$ and 2 should be the easiest to implement. The adapted or modified version of the second technique described above, where the amplitude algorithm is changed to include a further square root could also be implemented with different $\alpha_{nm}$ to improve even further the phase angle scatter plots in the presence of noise.

Typical software and hardware implementations of the various methods in which the invention is embodied are possible for both a standard modem implementation, which employs only one carrier frequency and using any modulation technique e.g. PSK, QAM etc., and also for systems employing multiple sub-carrier OFDM. These will be described briefly, with reference to FIGS. 31 to 36.

Figure 31:
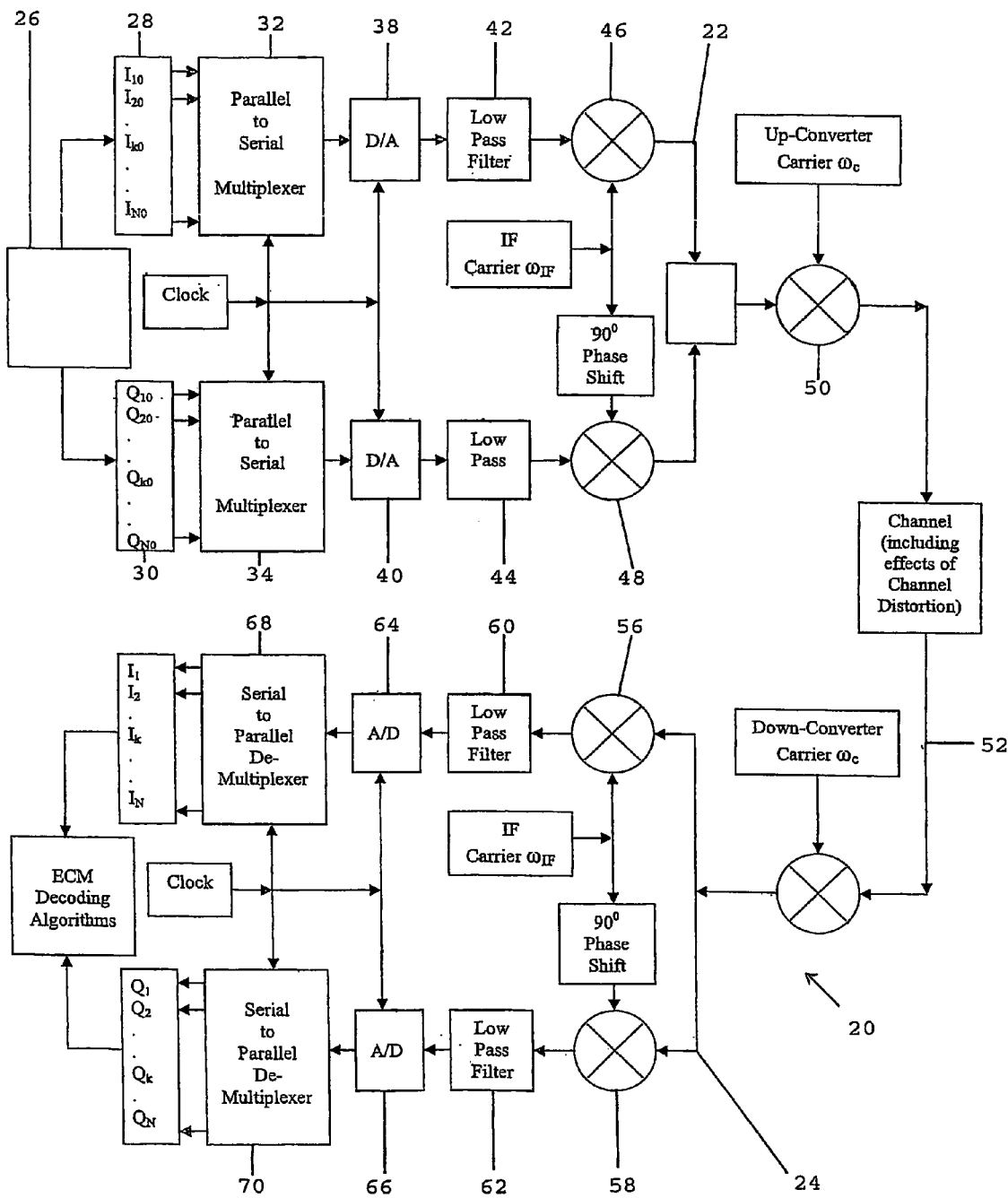
FIG. 31 is a block diagram of a typical modem transmission/reception system.

FIG. 31 shows a typical or basic modem transmission/reception system 20, which includes a transmitter 22 and receiver 24. Each of the transmitter 22 and/or receiver 24 could be included in any suitable telecommunications device, such as a personal mobile communications device or mobile/radio telephone or a computer with telecommunications capabilities or a digital broadcast radio or a digital television or set top box or any wireless networked device.

At the transmission end of the system of FIG. 31, there is provided an encoding module 26 that includes a processor (not shown) for outputting a series of blocks of data. In accordance with the invention, included in this series of blocks is a control block that includes control/calibration data. Each block has an in-phase component I 28 and a quadrature component Q 30. Connected to the output of the encoding module is a first parallel-to-serial multiplexer 32 for processing the in-phase components I of each block and a second parallel to serial multiplexer 34 for processing the quadrature components Q of each block. Connected to each of the first and second multiplexers 32 and 34 respectively is a clock 36 that controls clocking of the I and Q components through both of the multiplexers 32 and 34. First and second digital to analogue converters 38 and 40 are connected to the outputs of the first and second multiplexers 32 and 34 respectively. Each of these 38 and 40 is in turn connected to a low pass filter 42 and 44. A mixer 46 and 48 is provided at the output of the low pass filters 42 and 44 to modulate the I data components and the Q data components, but phase shifted by ninety degrees, onto a single carrier frequency $\omega_{IF}$. This signal is then up-converted at a single mixer 50 using a carrier frequency $\omega_c$ and transmitted over a transmission channel 52 of the network to a receiver.

The receiver 24 of FIG. 31 includes a down converter 54 for down converting the received signal from $\omega_c$ to the single intermediate carrier frequency $\omega_{IF}$. This received signal is then passed into each of two parallel processing branches, one for processing the I components of the signal and the other for processing the Q components. Each of these branches includes a mixer 56 and 58 for de-modulating the received signal. Connected to the output of each mixer is a low pass filter 60 and 62. Connected to each filter 60 and 62 is an analogue to digital converter 64 and 66 that can communicate with a serial-to-parallel de-multiplexer 68 and 70. At the output of each of the de-multiplexers 68 and 70 is a single decoding unit 72 for decoding the received signals.

Figure 32:
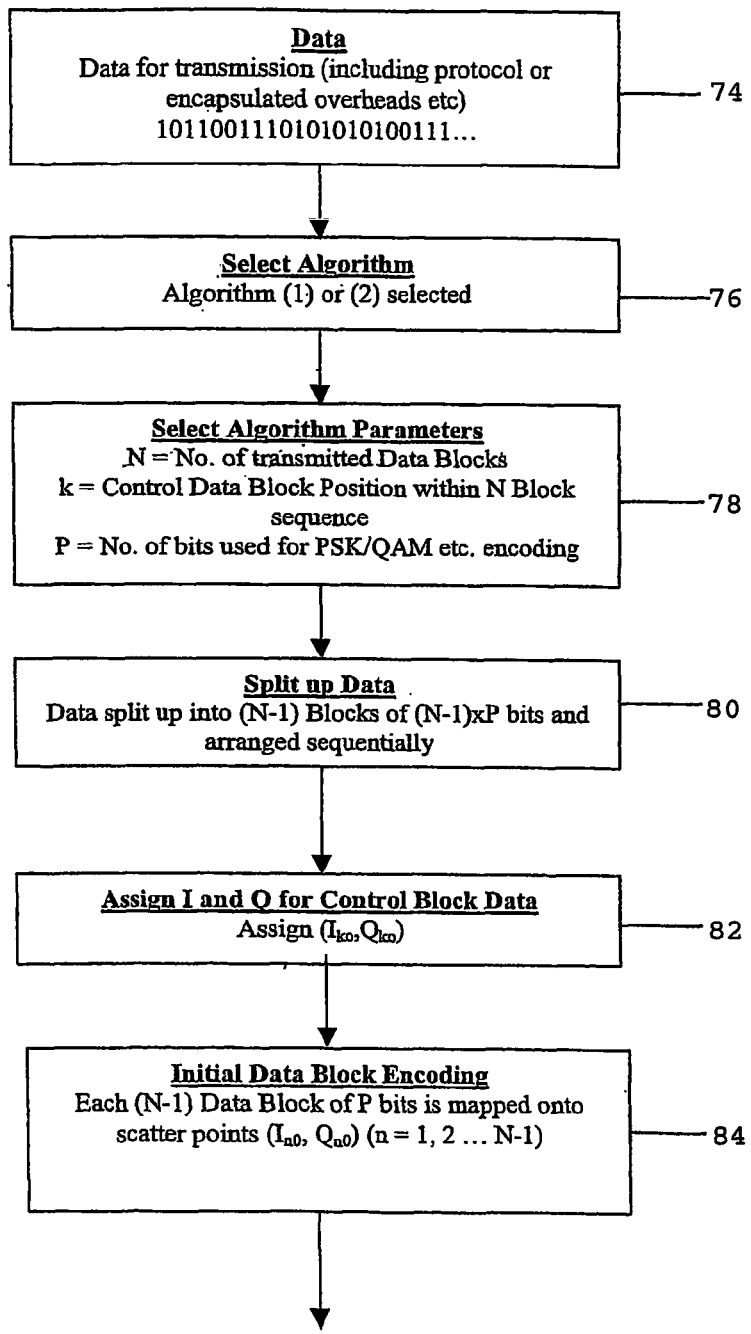
FIG. 32 is a flow diagram of the steps taken to encode a message in accordance with the method in which the invention is embodied and using the system of FIG. 31.

FIG. 32 shows the steps involved to encode data in accordance with the present invention using the system of FIG. 31. Firstly, data that is to be transmitted is forwarded to the encoding unit for processing 74. Then the desired algorithm is selected 76. This can be the algorithm associated with either one of the two techniques previously described. The algorithm parameters are then selected 78. These include the number of data blocks N; the control data block position k within the N block sequence and the number of bits P used for the PSK/QAM encoding. Once the parameters are selected, the data is split up into (N−1) blocks of {(N−1)×P} bits and arranged sequentially 80. Then, I and Q data ($I_{k0}$, $Q_{k0}$) is assigned for the control block 82, and each (N−1) data block of P bits is mapped onto scatter points ($I_{n0}$, $Q_{n0}$), where n=1, 2 . . . N−1 84. The data bits are then mapped 88 using for example PSK or QAM to provide P-bit pattern maps 87, which in turn are mapped 90 onto scatter plots 89 having Q and I axes. Each data block of P bits is then encoded 91 using whichever of the encoding algorithms was selected, thereby to produce new convoluted scatter plots ($I^c_{n0}$, $Q^c_{n0}$). For example, using the first encoding technique in which the invention is embodied each entry of the data block may be convoluted with the corresponding entry of the pilot control block. As described previously, this could be done by merely adding the phase angle of a given entry of the control to the phase angle of the corresponding entry of the data block.

Once the convolution is done, the data control block scatter point ($I_{k0}$, $Q_{k0}$) is inserted 92 to produce a total of N data blocks. The I and Q values are then formed into N size (I, Q) data block arrays 93, ready for transmission 94. Each value in the array is sequentially clocked through one of the first or second multiplexers 32, 34, passed through the digital to analogue converters 38, 40 and the low pass filters 42, 44; modulated with the intermediate frequency carrier $\omega_{IF}$ and then up-converted and transmitted to a remote receiver 24. At the same time, construction of the next data block begins 96, so that when transmission of the first I and Q data blocks is completed, the next data blocks are ready for transmission.

Figure 33:
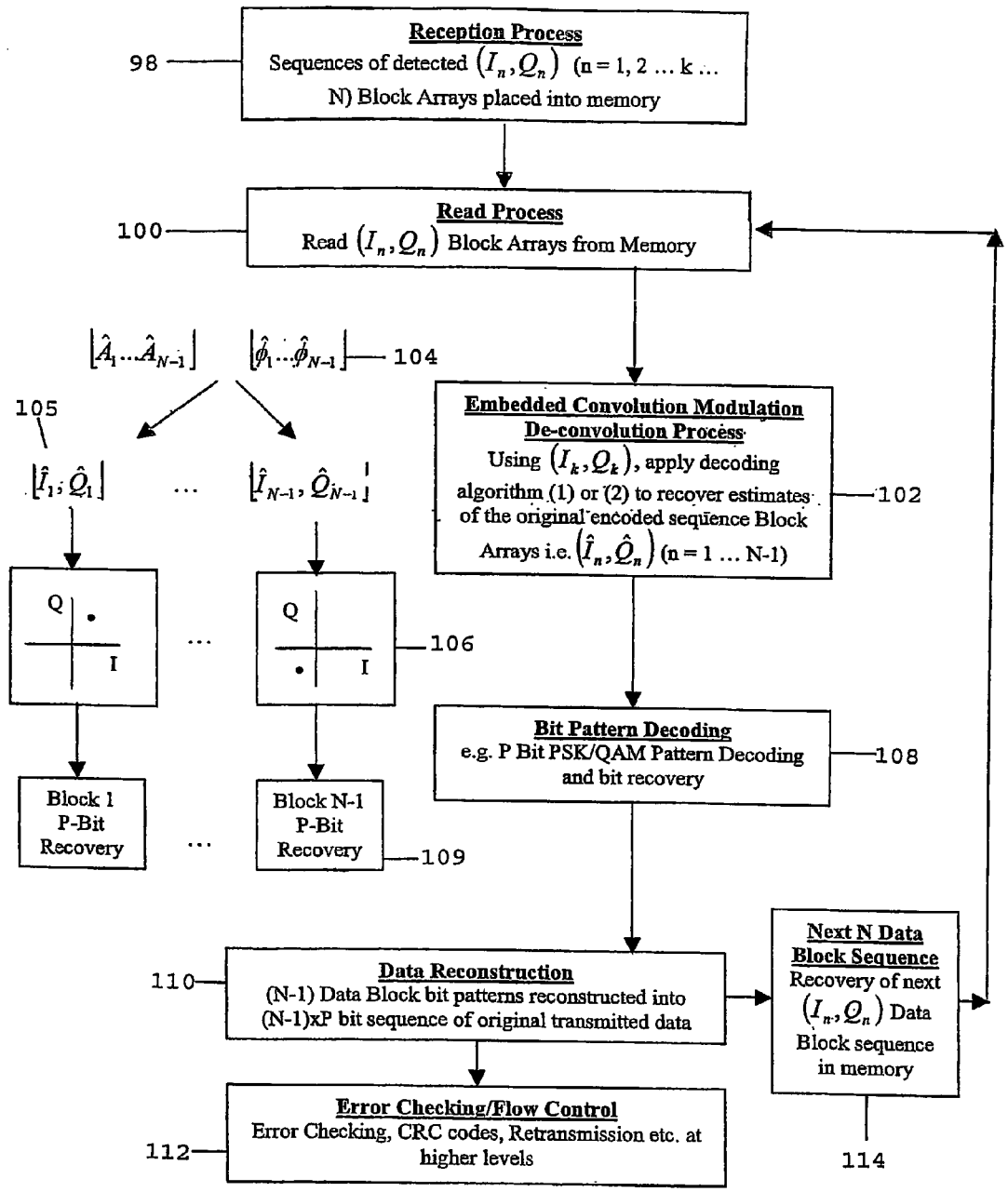
FIG. 33 is a flow diagram of the steps taken to decode a message in accordance with the method in which the invention is embodied, again using the system of FIG. 31.

FIG. 33 shows the steps taken at the receiver 24 when a signal is received from the transmitter 22 of FIG. 31. In this case, a sequence of ($I_n$, $Q_n$) block arrays is received and stored in memory 98, where n=1, 2 . . . N. The ($I_n$, $Q_n$) block arrays are read from memory 100 and the decoding algorithm is applied 102 to recover estimates of the original encoded sequence of block arrays. Of course, the decoding algorithm must be appropriate for the encoding algorithm used for the transmission of the data. In order to recover the original data the steps taken are effectively the reverse of the steps taken in the transmission sequence. More specifically, the received I and Q data is used to provide estimates of the transmitted I and Q data components using whatever technique is appropriate for the encoding used in the transmission sequence. Typically, this involves firstly determining estimates for the original signal amplitudes and phase angles 104 and using these to determine estimates for the I and Q components 105. The estimated data is then de-mapped onto scatter plots 106 having I and Q axes. Bit pattern decoding is applied 108 to determine a series of data block bit patterns 109. The (N−1) data block bit patterns are then reconstructed 110 to produce a {(N−1)×P} bit sequence of original transmitted data. This is checked for errors using any suitable technique 112. Whilst this decoding process proceeds, the next data block in the sequence is recovered and decoding of this commenced 114.

Figure 34:
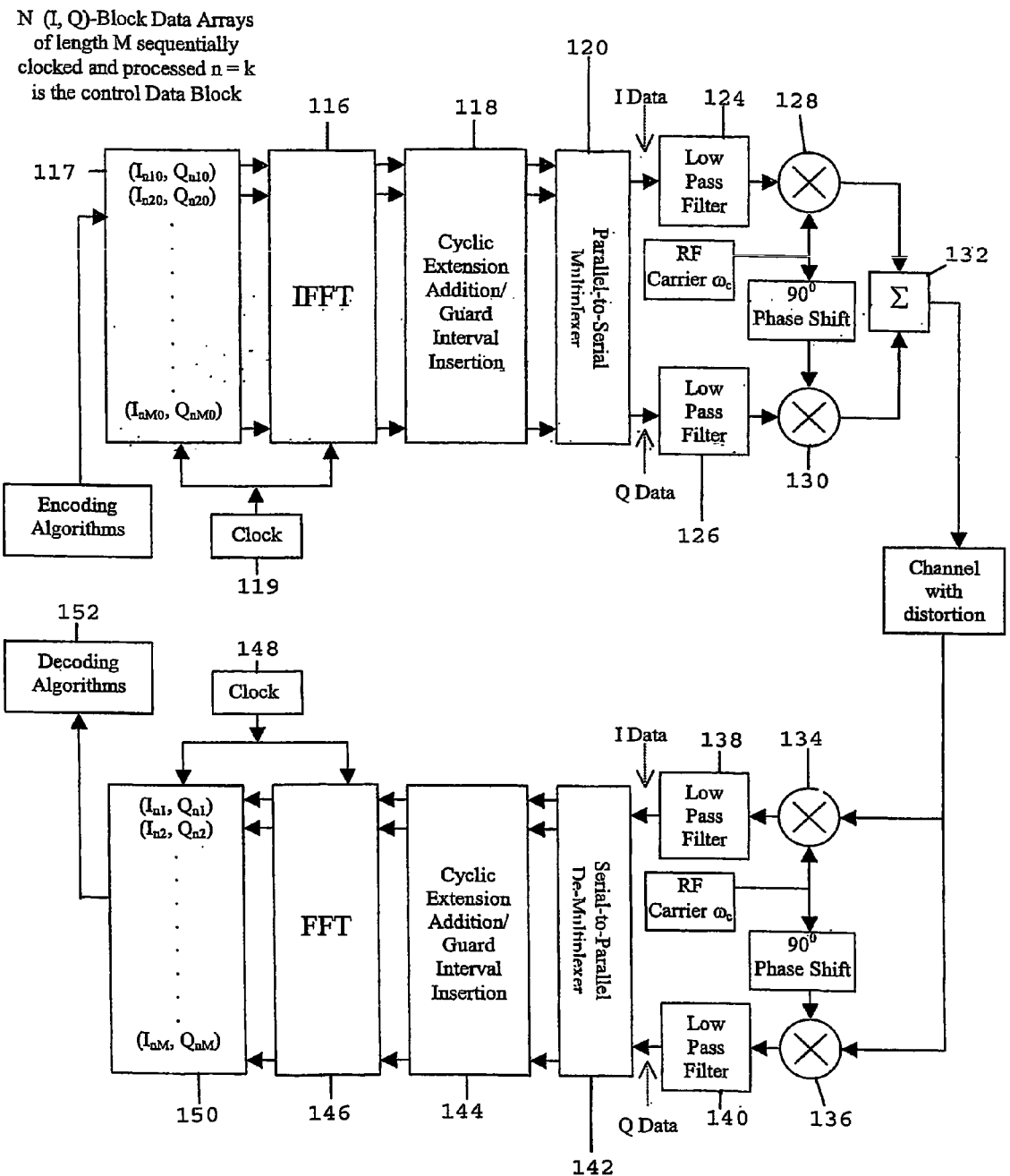
FIG. 34 is a block diagram of an OFDM transmission/reception system.

FIG. 34 shows another system that can be used to implement the present invention. This is a typical, simple OFDM system, which additionally includes an encoding unit or module 116 for implementing an encoding algorithm in accordance with the invention and a decoding unit or module 152 for implementing decoding algorithms in accordance with the present invention. As before, each of the transmitter and/or receiver could be included in any suitable telecommunications device, such as a personal mobile communications device or mobile/radio telephone or a computer with telecommunications capabilities or a digital broadcast radio or a digital television or set top box or any wireless networked device.

The transmitter end of the system of FIG. 34 has an encoding unit 116 that is operable to provide N (I,Q) block arrays of length M 117. These are sequentially clocked using a clock 119 into an Inverse Fast Fourier Transform (IFFT) module 118. The output of the IFFT 118 is processed to add in a cyclic extension or a guard interval 120. The output of this is passed to a parallel-to-serial multiplexer 122, which separates the data into I data and Q data. Each I and Q data stream is passed through a low pass filter 124 and 126 respectively, and modulated with an RF carrier frequency cc at mixers 128 and 130 respectively. The resultant signals are then passed to a summer 132, where they are added and transmitted over an appropriate transmission channel to the receiver.

The receiver end of the system of FIG. 34 has two mixers 134 and 136 for demodulating the received signal using the RF carrier frequency $\omega_C$. The first mixer 134 outputs the I data. The second mixer 136 outputs the Q data. Connected to the first mixer 134 is a low pass filter 138. Connected to the second mixer 136 is another low pass filter 140. Each of the received I and Q data is input to a serial-to-parallel de-multiplexer 142, which is connected at its output to a cyclic extension/guard interval removal module 144. At the output of the removal module 144, is provided a Fast Fourier Transform module 146, which sequentially transforms the data and clocks it out using a clock 148 to provide a series of blocks of received data 150. These blocks are then input to the decoding unit 152, where they are decoded in a manner that is the reverse of the encoding method used.

Figure 35:
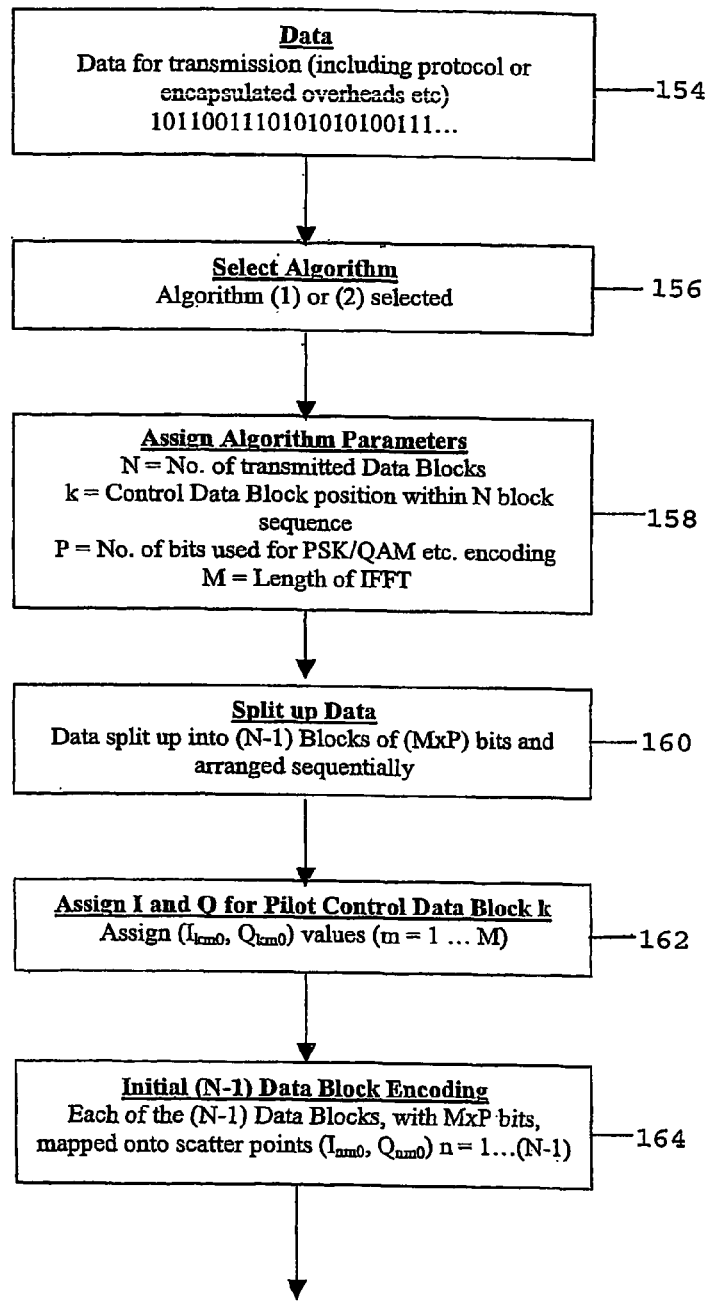
FIG. 35 is a flow diagram of the steps taken to encode a message in accordance with the method in which the invention is embodied and using the system of FIG. 34.

FIG. 35 shows the steps taken to encode data that is to be transmitted using the system of FIG. 34. The first step is to accumulate the data that is to be transmitted, including any protocols or encapsulated overheads, etc 154. Then the appropriate algorithm is selected 156, and the algorithm parameters such as the number of transmitted data blocks N, the control block position k, the number of bits P used for PSK or QAM and the length M of the IFFT are assigned 158. Once this is done, the data is split up into (N−1) blocks of (M×P) bits and arranged sequentially 160. Then, data values I and Q are assigned for the pilot control data block 162. Each of the N−1 real data blocks is then encoded by mapping them onto scatter points 164. The M segments of data are then bit pattern mapped 166 using PSK or QAM and the I and Q data is mapped 168 onto scatter plots. The data is then convoluted with the control block data in whichever manner is selected at step 156, thereby to produce new convoluted scatter points $(I^c_{nm0}, Q^c_{nm0})$, where n=1, ... N−1 and m=1 ... M. The control data block k scatter points are then inserted 172 to produce a total of N blocks. The I and Q values are then formed into M $(I^c_{nm0}, Q^c_{nm0})$ block arrays for forwarding to the IFFT 174. Once the arrays are defined, each entry in the first array is sequentially passed to the IFFT module of the transmitter of FIG. 34, where an IFFT is performed 176. This is done for every block, including the control data block. The N data blocks of IFFT values are stored for transmission 178. At this stage, a cyclic extension or guard interval may be added to the N IFFT data blocks 180. The data is then transmitted 182. More specifically, the data is passed to the parallel to serial multiplexer of FIG. 34, where it is divided into I data and Q data. The I data is subsequently passed through the first low pass filter and the Q data is passed through the second low pass filter. The I signal is then modulated using the RF carrier frequency $\omega_C$ and the Q data is modulated using the frequency $\omega_C$ phase-shifted by ninety degrees. The resultant signals are added and subsequently transmitted on an appropriate transmission channel 180.

Figure 36:
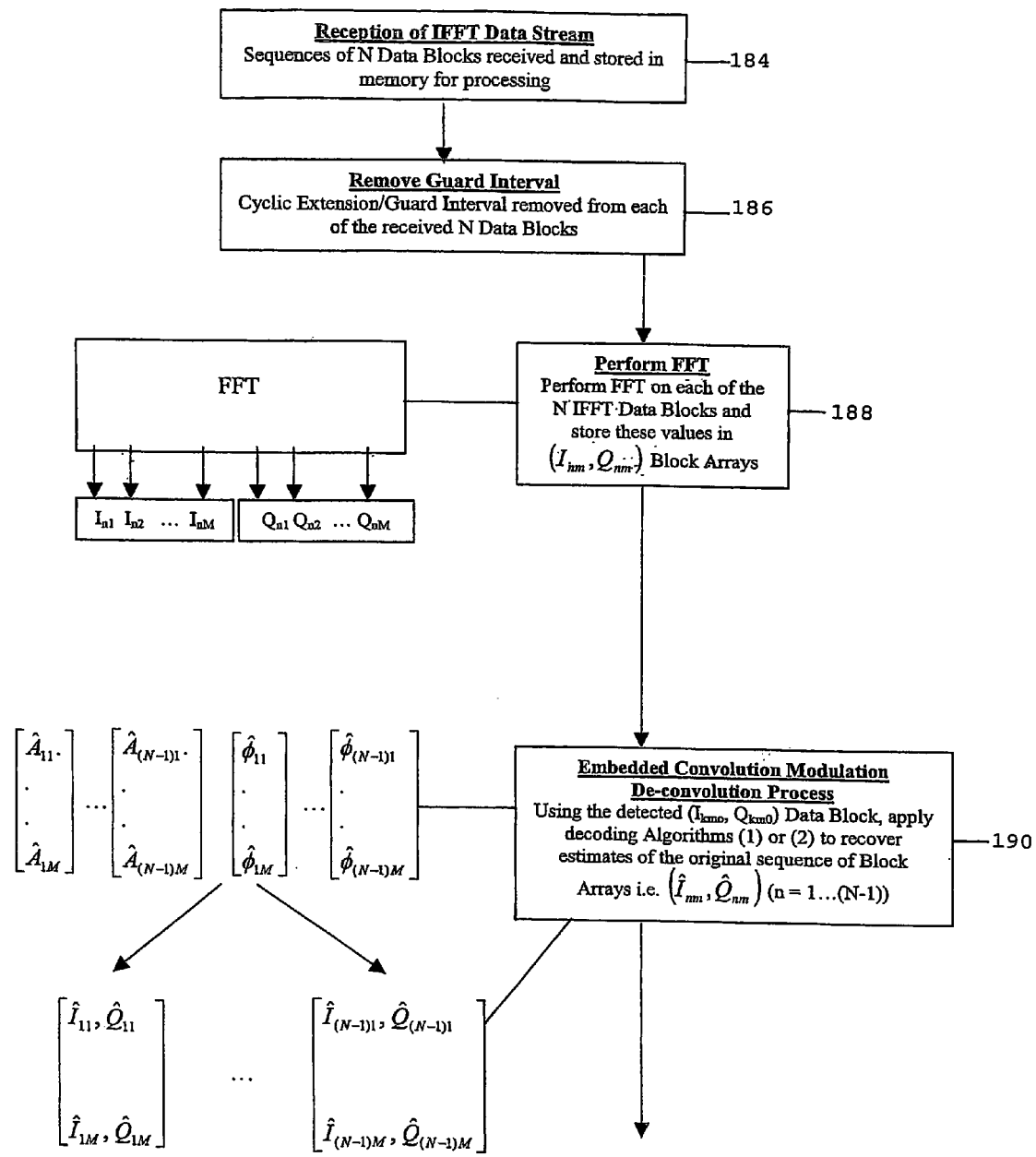
FIG. 36 is a flow diagram of the steps taken to decode a message in accordance with the method in which the invention is embodied, again using the system of FIG. 34.

FIG. 36 shows the steps that taken to decode a signal received from the transmitter end of the system of FIG. 34. Firstly, a stream of the IFFT data is received and stored for processing 184. The I components of the data stream are then de-modulated using the RF carrier frequency $\omega_C$, and the Q components are de-modulated using the RF carrier frequency $\omega_C$ phase shifted by ninety degrees. The I and Q data is forwarded to the serial to parallel de-multiplexer where received data blocks (I,Q) are constructed. These data blocks are processed using the cyclic extension module to remove the cyclic extension and/or guard interval 186. They are then transformed using the Fast Fourier Transform module 188. Data output from the FFT module is sequentially clocked into an array $(I_{nm}, Q_{nm})$ of processed, received data. This array is then decoded 190. This is done using one of the above-described techniques in which the invention is embodied in order to recover estimates of the I and Q components.

Once the array is decoded, the data block patterns are decoded using for example PSK or QAM to recover the original bit patterns 192. This is done by mapping the estimated I and Q components onto scatter plots 193. The scatter plots 193 are then used to apply bit pattern decoding, using for example PSK or QAM, depending on what was used when the signal was transmitted. The (N−1) blocks of real data are then reconstructed into a {(N−1)×M×P} bit sequence of original transmitted data, and the original data sequence is reconstructed 194. In accordance with standard practice, error-checking 196 may be carried out on this data. In this way, estimates of the original data can be obtained. Whilst decoding of one block is underway, the processor in the decoding unit moves onto the next data block and starts decoding this 198. In this way, each data block is sequentially processed and decoded to provide all of the original data.

The systems and methods in which the present invention is embodied have many advantages. For example, like FDRM, they help eliminate channel echo distortion and avoid the need for equalizers. However, they provide a higher data rate transfer than FDRM, i.e. less data blocks transmitted for the same information transfer, thus benefiting and improving data rate efficiency. Also, they allow larger and smaller amplitude sub-carrier frequency components to be decoded more accurately than FDRM in the presence of noise, i.e. QAM can be more readily utilised in the sub-carriers. In addition, they allow for the possibility of minimising crest factor due to random phase angles in the pilot control data block, thus allowing larger amplitude pilot signals and reducing transmitter distortion in OFDM systems.

A further advantage of the invention is that the random allocation of pilot tone phase angles does not have to be known by the receiver. Currently, in OFDM systems, the phase angle assignments must be known by the receiver to allow channel estimation and distortion elimination. This is not a problem in the methods in which the invention is embodied. The transmitter can randomly change or alter the phase angles to minimise crest factor and not inform the receiver, yet the receiver is able to recover the original data, providing of course the original pilot control amplitude in known. This allows powerful, unique, adaptive crest factor phase algorithms for pilot tones to be implemented, which do not have to be known by the receiver for decoding purposes.

The systems and methods of the present invention also allow for an estimation of channel distortion on all sub-carrier frequencies of OFDM transmissions whilst data is being transmitted on that subcarrier, thus interpolation of sub-carrier channel distortion is not required. Also, errors on the decoded sub-carrier information should be smaller as interpolation, which contains errors itself, need not be applied.

A skilled person will appreciate that variations of the disclosed arrangements are possible without departing from the invention. For example, whilst a simple transmitter and receiver arrangement has been described, other more complex arrangements could be used. In particular the systems and devices could be adapted to take into account the effects of receiving signals in a fading environment. As an example, signal diversity and smart antenna systems that employ a number of receiving antennas to pick up and optimise the best signal in fading environments may be used. Also an antenna polarization diversity system may be provided to improve the received signal in fading environments. Furthermore, time diversity systems such as RAKE receivers may be used to improve the detected signal in fading environments. Accordingly, the above description of a specific embodiment is made by way of example only and not for the purposes of limitation. It will be clear to the skilled person that minor modifications may be made, for example to include bit interleaving, or Trellis Code structures, or additional pilot tome transmissions, without significant changes to the operation described.

The invention claimed is:

1. A method for encoding data for transmission over a telecommunications network comprising embedding a control data block within a plurality of real data blocks; modulating or transforming the control data block through phase angle convoluting each real data entry of each real data block with phase angles of the corresponding entries of the other real data blocks and embedding the convoluted real data entries into the control data block; modulating or transforming the plurality of real data blocks through modifying the plurality of real data blocks with at least some of the convoluted real data entries placed into the control data block; and modulating or transforming data in the plurality of real data blocks and the control data block with every sub-carrier that is used to modulate the real data entries, wherein each entry of the control data block has a phase angle that is a function of the phase angles of the corresponding entries of the real data blocks and the phase angle convoluting comprises subtracting from the phase angle of each real data entry all of the phase angles of all of the corresponding entries of all of the other real data blocks.

2. A method as claimed in claim 1, wherein each of the control and real data blocks has m entries, where m is an integer of one or more, and m sub-carrier transmission channels are provided, and each control data entry and each real data entry are modulated with the corresponding sub-carrier.

3. A method as claimed in claim 1, wherein the convoluted encoded data blocks can be represented by: $X_{nm}=A_{nm0}\exp(j(\phi_{nm0}+\phi_{km0}))$, where $A_{nm0}\exp(j(\phi_{nm0}))$ is the original encoded quadrature signal in data block n for sub-carrier m, where $A_{nm0}$ is the amplitude of the encoded quadrature signal in data block n for subcarrier m; $\phi_{nm0}$ is the original phase angle for data block n and sub-carrier m; and $\phi_{km0}$ is the original phase angle for an inserted control data block k, and sub-carrier m.

4. A method as claimed in claim 1, wherein each phase angle for the control data in the control data block is randomly assigned.

5. A method as claimed in claim 1, wherein the phase angle of each entry of the control data block is the sum of the phase angles of the corresponding entries of real data blocks.

6. A method as claimed in claim 1, wherein the encoding of an N block data transmission can be represented as follows:

$$X_{1m0} = I^c_{1m0} + jQ^c_{1m0} =$$
$$A_{1m0}\exp(j(\alpha_{1m}\phi_{1m0} - \alpha_{2m}\phi_{2m0} - \alpha_{3m}\phi_{3m0} - \ldots - \alpha_{Nm}\phi_{Nm0}))$$
$$X_{2m0} = I^c_{2m0} + jQ^c_{2m0} =$$
$$A_{2m0}\exp(j(\alpha_{2m}\phi_{2m0} - \alpha_{1m}\phi_{1m0} - \alpha_{3m}\phi_{3m0} - \ldots - \alpha_{Nm}\phi_{Nm0}))$$
$$\vdots$$
$$X_{km0} = I^c_{km0} + jQ^c_{km0} =$$
$$A_{km0}\exp(-j(\alpha_{1m}\phi_{1m0} + \alpha_{2m}\phi_{2m0} + \alpha_{3m}\phi_{3m0} + \ldots + \alpha_{Nm}\phi_{Nm0}))$$
$$\vdots$$
$$X_{Nm0} = I^c_{Nm0} + jQ^c_{Nm0} =$$
$$A_{Nm0}\exp(j(\alpha_{Nm}\phi_{Nm0} - \alpha_{1m}\phi_{1m0} - \alpha_{2m}\phi_{2m0} - \ldots - \alpha_{(N-1)m}\phi_{(N-1)m0}))$$

where, for n=1, 2 ... N, $X_{nm0}$ represents the new encoded signal in data block n for subcarrier m; $I^C_{nm0}$ and $Q^C_{nm0}$ represent the in-phase and quadrature components of the convoluted signal; $A_{nm0}$ is the amplitude of the original signal in data block n for subcarrier m; $\square_{nm0}$ is the phase angle of the original data within in data block n, for subcarrier m; $X_{km0}$ represents the control data signal in the control data block k for subcarrier m; $I^C_{km0}$ and $Q^C_{km0}$ represent the in-phase and quadrature components of the signal in the control block k, for subcarrier m; $A_{km0}$ is the amplitude of the signal in control block k for subcarrier m; and where the terms $\alpha_{nm}$ (n=1, 2 ... N) are constants associated with the convolution of each phase angle of the original data within the N data blocks on the sub-carrier m.

7. A method as claimed in claim 1, wherein the step of modulating comprises frequency modulating the signal.

8. A method as claimed in claim 1, comprising receiving data for transmission to a receiver, dividing the data into N−1 data blocks and embedding a the control data block into the N−1 data blocks to provide a N block data transmission.

9. A method as claimed in claim 1, wherein the control data block is embedded substantially in the middle of the plurality of real data blocks.

10. A method as claimed in claim 1, wherein a plurality of control data blocks are embedded within the plurality of real data blocks.

11. A computer program, on a non-transitory computer readable medium, having code or instructions, that when executed by a processor, are configured to:
- embed a control data block within a plurality of real data blocks;
- modulate or transform or form the control data block through phase angle convoluting each real data entry of each real data block with phase angles of the corresponding entries of the other real data and embedding the convoluted real data entries into the control data block;
- modulate or transform the plurality of real data blocks through modifying the plurality of real data blocks with at least some of the convoluted real data entries placed into the control data block; and
- modulate or transform data in the plurality of real data blocks and the control data block with every sub-carrier that is used to modulate the real data entries, wherein each entry of the control data block has a phase angle that is a function of the phase angles of the corresponding entries of the real data blocks and the phase angle convoluting comprises subtracting from the phase angle of each real data entry all of the phase angles of all of the corresponding entries of all of the other real data blocks.

12. An apparatus for encoding data for transmission over a telecommunications network, the apparatus comprising one or more processors configured to:
- embed a control data block within a plurality of real data blocks;
- modulate or transform or form the control data block through phase angle convoluting each real data entry of each real data block with phase angles of the corresponding entries of the other real data and embedding the convoluted real data entries into the control data block;
- modulate or transform the plurality of real data blocks through modifying the plurality of real data blocks with at least some of the convoluted real data entries placed into the control data block; and
- modulate or transform data in the plurality of real data blocks and the control data block with every sub-carrier that is used to modulate the real data entries, wherein each entry of the control data block has a phase angle that is a function of the phase angles of the corresponding entries of the real data blocks and the phase angle convoluting comprises subtracting from the phase angle of each real data entry all of the phase angles of all of the corresponding entries of all of the other real data blocks.

* * * * *

UNITED STATES PATENT AND TRADEMARK OFFICE
CERTIFICATE OF CORRECTION

PATENT NO.        : 8,126,075 B2
APPLICATION NO.   : 10/549387
DATED             : February 28, 2012
INVENTOR(S)       : Stewart It is certified that error appears in the above-identified patent and that said Letters Patent is hereby corrected as shown below:

Column 4
Line 26, " $\hat{\theta} = \frac{1}{2} tan^{-1}\left[\frac{I_2 Q_1 - I_1 Q_2}{I_1 I_2 - Q_1 Q_2}\right]$ " should read -- $\hat{\theta} = \frac{1}{2} tan^{-1}\left[\frac{I_2 Q_1 - I_1 Q_2}{I_1 I_2 + Q_1 Q_2}\right]$ --

Column 9
Line 43, " $X_{nm} = I_{nm}jQ_{nm} = (I^c_{nm0} + JQ^c_{nm0})A_{att}H = A_{nm0}exp(j(\phi_{nm0} + \phi_{km0})A_{att}H(n \neq k))$ " should read
-- $X_{nm} = I_{nm}+jQ_{nm} = (I^c_{nm0} + JQ^c_{nm0})A_{att}H = A_{nm0}exp(j(\phi_{nm0} + \phi_{km0})A_{att}H(n \neq k))$ --

Column 11
Line 18, " $X_{nm} = I_{nm} = JQ_{nm} = (I_{nm0} + JQ_{nm0})A_{att}H = A_{nm0}exp(J\phi_{nm0})A_{att}H (n \neq K)$ " should read -- $X_{nm} = I_{nm} + JQ_{nm} = (I_{nm0} + JQ_{nm0})A_{att}H = A_{nm0}exp(J\phi_{nm0})A_{att}H(n \neq K)$ --

Line 30, " $\hat{\theta}_{nm} = tan^{-1}\left[\frac{I_{km}Q_{nm} - I_{nm}Q_{km}}{I_{nm}I_{km} - Q_{nm}Q_{km}}\right] + \phi_{km0}\ n=1,2...N(n \neq k)$ " should read
-- $\hat{\theta} = tan^{-1}\left[\frac{I_{km}Q_{nm} - I_{nm}Q_{km}}{I_{nm}I_{km} + Q_{nm}Q_{km}}\right] + \phi_{km0}\ n=1,2...N(n \neq k)$ --

Signed and Sealed this
Seventeenth Day of July, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,126,075 B2 | Page 1 of 1 |
| APPLICATION NO. | : 10/549387 | |
| DATED | : February 28, 2012 | |
| INVENTOR(S) | : Stewart | |

It is certified that error appears in the above-identified patent and that said Letters Patent is hereby corrected as shown below:

Column 11

Line 30 " $\hat{\phi}_{nm} = tan^{-1}\left[\frac{I_{km}Q_{nm} - I_{nm}Q_{km}}{I_{nm}I_{km} - Q_{nm}Q_{km}}\right] + \phi_{km0}$ $n=1,2...N(n \neq k)$ ," should read -- $\hat{\phi}_{nm} = tan^{-1}\left[\frac{I_{km}Q_{nm} - I_{nm}Q_{km}}{I_{nm}I_{km} + Q_{nm}Q_{km}}\right] + \phi_{km0}$ $n=1,2...N(n \neq k)$ --

Signed and Sealed this
Fifteenth Day of January, 2013

David J. Kappos
*Director of the United States Patent and Trademark Office*